US012579180B2

(12) United States Patent　　(10) Patent No.: US 12,579,180 B2
Sakakibara et al.　　(45) Date of Patent: Mar. 17, 2026

(54) EVALUATION SUPPORT PROGRAM, EVALUATION SUPPORT METHOD, AND EVALUATION SUPPORT DEVICE

(71) Applicant: Datascientist Inc., Tokyo (JP)

(72) Inventors: Naoya Sakakibara, Tokyo (JP); Shinji Arisawa, Tokyo (JP); Yuki Hirobe, Tokyo (JP)

(73) Assignee: Datascientist Inc., Tokyo (JP)

( * ) Notice: Subject to any disclaimer, the term of this patent is extended or adjusted under 35 U.S.C. 154(b) by 0 days.

(21) Appl. No.: 18/259,186

(22) PCT Filed: Dec. 23, 2020

(86) PCT No.: PCT/JP2020/048168
§ 371 (c)(1),
(2) Date: Jun. 23, 2023

(87) PCT Pub. No.: WO2022/137387
PCT Pub. Date: Jun. 30, 2022

(65) Prior Publication Data
US 2024/0054152 A1　　Feb. 15, 2024

(51) Int. Cl.
*G06F 16/358*　　(2025.01)
*G06F 16/3332*　　(2025.01)
*G06F 16/338*　　(2019.01)

(52) U.S. Cl.
CPC ........ *G06F 16/358* (2019.01); *G06F 16/3334* (2019.01); *G06F 16/338* (2019.01)

(58) Field of Classification Search
None
See application file for complete search history.

(56) References Cited

U.S. PATENT DOCUMENTS

2008/0270389 A1* 10/2008 Jones .................... G06F 16/951
　　　　　　　　　　　　　　　　707/999.005
2010/0094854 A1* 4/2010 Rouhani-Kalleh .........................
　　　　　　　　　　　　　　　　G06F 16/3325
　　　　　　　　　　　　　　　　707/706
(Continued)

FOREIGN PATENT DOCUMENTS

JP　　2004-240887 A　　8/2004
JP　　2020-042637 A　　3/2020

OTHER PUBLICATIONS

International Search Report issued in PCT/JP2020/048168; mailed Mar. 16, 2021.
(Continued)

*Primary Examiner* — Kannan Shanmugasundaram
(74) *Attorney, Agent, or Firm* — Studebaker Brackett PLLC

(57) ABSTRACT

In evaluating a trend of attracting visitors to a web site or a web page, it is difficult to quickly discriminate a search query group that contributes to attracting visitors and a search query group that does not contribute to attracting visitors for each segment. In addition, when a new web site or web page is constructed, it is difficult to easily grasp to which segment the web page or content should be enriched. Provided is an evaluation support program that causes a computer to function as: search data acquisition means configured to acquire, from a search engine, search data indicating a relationship between a search query including one or more words, a web page included in a search result for each search query, and a display ranking of the web page; classification means configured to classify each search query into any of a plurality of segments based on the one or more words; and display data generation means configured to
(Continued)

| a-suits.com | | | |
|---|---|---|---|
| BRAND | AREA | SERVICE | · · · |
| "AAA" 15 SEARCH QUERIES AND 70,000 SEARCHES/MONTH | "TOKYO" 16 SEARCH QUERIES AND 23,000 SEARCHES/MONTH | "DOUBLE-BREASTED" 5 SEARCH QUERIES AND 15,000 SEARCHES/MONTH | |
| "BBB" 18 SEARCH QUERIES AND 28,000 SEARCHES/MONTH | "OSAKA" 5 SEARCH QUERIES AND 10,000 SEARCHES/MONTH | "LADIES" 46 SEARCH QUERIES AND 90,000 SEARCHES/MONTH | |
| "CCC" 9 SEARCH QUERIES AND 15,000 SEARCHES/MONTH | "KYOTO" 11 SEARCH QUERIES AND 28,000 SEARCHES/MONTH | "MEN'S" 45 SEARCH QUERIES AND 40,000 SEARCHES/MONTH | | generate display data for displaying which of the plurality of segments at least a part of the search query is classified into.

21 Claims, 18 Drawing Sheets

(56) References Cited

U.S. PATENT DOCUMENTS

| | | | |
|---|---|---|---|
| 2010/0153094 A1* | 6/2010 | Lee ..................... | G06F 16/3329 |
| | | | 707/E17.002 |
| 2013/0212108 A1* | 8/2013 | Armon-Kest ......... | G06F 16/353 |
| | | | 707/E17.046 |
| 2014/0095427 A1* | 4/2014 | Fox ....................... | G06F 16/245 |
| | | | 707/603 |
| 2015/0363051 A1* | 12/2015 | Yao ........................ | G06Q 30/02 |
| | | | 715/739 |
| 2016/0086280 A1* | 3/2016 | Okiyama ............ | G06F 16/9535 |
| | | | 705/36 R |
| 2016/0266738 A1* | 9/2016 | Martello ................ | G06F 16/00 |
| 2017/0214954 A1* | 7/2017 | Trollope .............. | H04N 21/251 |
| 2019/0324981 A1 | 10/2019 | Counts et al. | |

OTHER PUBLICATIONS

"Notice of Reasons for Refusal" Office Action issued in JP 2022-558382; mailed by the Japanese Patent Office on Dec. 6, 2022.
"Notice of Reasons for Refusal" Office Action issued in JP 2022-558382; mailed by the Japanese Patent Office on Mar. 14, 2023.

* cited by examiner

*FIG. 2A*

SUIT     🔍 www.a-suits.com/home
A MENSWEAR

. . .

www.b-suits.jp
B MENSWEAR

. . .

www.a-suits.com/online
A MENSWEAR ONLINE STORE

| SEARCH QUERY | 1ST | 2ND | 3RD | ... | ECONOMIC SCALE | NUMBER OF SEARCHES/MONTH |
|---|---|---|---|---|---|---|
| SUIT | www.a-suits.com/home | www.b-suits.jp | www.a-suits.com/online | | 11,300 | 400,000 |
| SET OF SUIT | | | | | | |
| DOUBLE-BREASTED SUIT | | | | | | |
| SHIRT | | | | | | |
| SHIRT SUMMER | | | | | | |
| ... | | | | | | |
| | | | | | | |

FIG. 2C

| SEARCH QUERY | 1ST | 2ND | 3RD | ... | ECONOMIC SCALE | NUMBER OF SEARCHES/MONTH |
|---|---|---|---|---|---|---|
| SUIT | a-suits.com | b-suits.jp | a-suits.com | | | |
| SET OF SUIT | | | | | | |
| DOUBLE-BREASTED SUIT | | | | | | |
| SHIRT | | | | | | |
| SHIRT SUMMER | | | | | | |
| ... | | | | | | |
| | | | | | | |

FIG. 3

| GROUP | BRAND | | | AREA | | | SERVICE | | |
|---|---|---|---|---|---|---|---|---|---|
| SUB GROUP | AAA | BBB | CCC | TOKYO | OSAKA | KYOTO | DOUBLE-BREASTED | LADIES' | MEN'S |
| SEARCH QUERY BELONGING TO SUB GROUP | SUIT AAA<br>AAA MADE-TO-ORDER SUIT<br>SUIT OF AAA | ... | ... | SUIT TOKYO<br>SUIT TOKYO<br>MADE-TO-ORDER SUIT TOKYO | ... | ... | DOUBLE-BREASTED SUIT<br>SUIT DOUBLE-BREASTED<br>SUIT OF DOUBLE-BREASTED TYPE | ... | ... |

FIG. 4

| KEYWORD | ECONOMIC SCALE | NUMBER OF SEARCH QUERIES | NUMBER OF SEARCHES/MONTH |
|---|---|---|---|
| SUIT | 1ST | 2,100 | 1,900,000 |
| SHIRT | 2ND | 1,500 | 2,500,000 |
| MEN'S | 3RD | 1,600 | 1,000,000 |
| . | . | . | . |
| . | . | . | . |
| . | . | . | . |

FIG. 5A

SEARCH RESULT OVERVIEW SCREEN
(COUNT IN UNITS OF PAGES)

TO DOMAIN-UNIT COUNTING SCREEN ~91

SUIT 2,100 SEARCH QUERIES 1,900,000 SEARCHES/MONTH

| | | 1ST | 2ND | 3RD |
|---|---|---|---|---|
| | | 3.55% (67,450) | 2.80% (53,200) | 2.11% (40,090) |

| SEARCH QUERY | NUMBER OF SEARCHES/ MONTH | WEBPAGE A | WEBPAGE B | WEBPAGE C | . . . |
|---|---|---|---|---|---|
| SUIT | 310,000 | 1ST | 15TH | – | |
| SUIT TRADE-IN | 70,000 | 2ND | 8TH | 3RD | |
| SUIT OSAKA | 55,000 | 8TH | 4TH | 9TH | |

SEARCH RESULT OVERVIEW SCREEN
(COUNT IN UNITS OF DOMAINS)

TO PAGE-UNIT COUNTING SCREEN ~92

SUIT 2,100 SEARCH QUERIES 1,900,000 SEARCHES/MONTH

| | | 1ST | 2ND | 3RD |
|---|---|---|---|---|
| | | 5.10% (96,900) | 4.75% (90,250) | 2.00% (38,000) |

| SEARCH QUERY | NUMBER OF SEARCHES/ MONTH | DOMAIN D | DOMAIN E | DOMAIN F | . . . |
|---|---|---|---|---|---|
| SUIT | 310,000 | 2ND | 8TH | 18TH | |
| SUIT TRADE-IN | 70,000 | 9TH | – | 8TH | |
| SUIT OSAKA | 55,000 | – | 3RD | 10TH | |

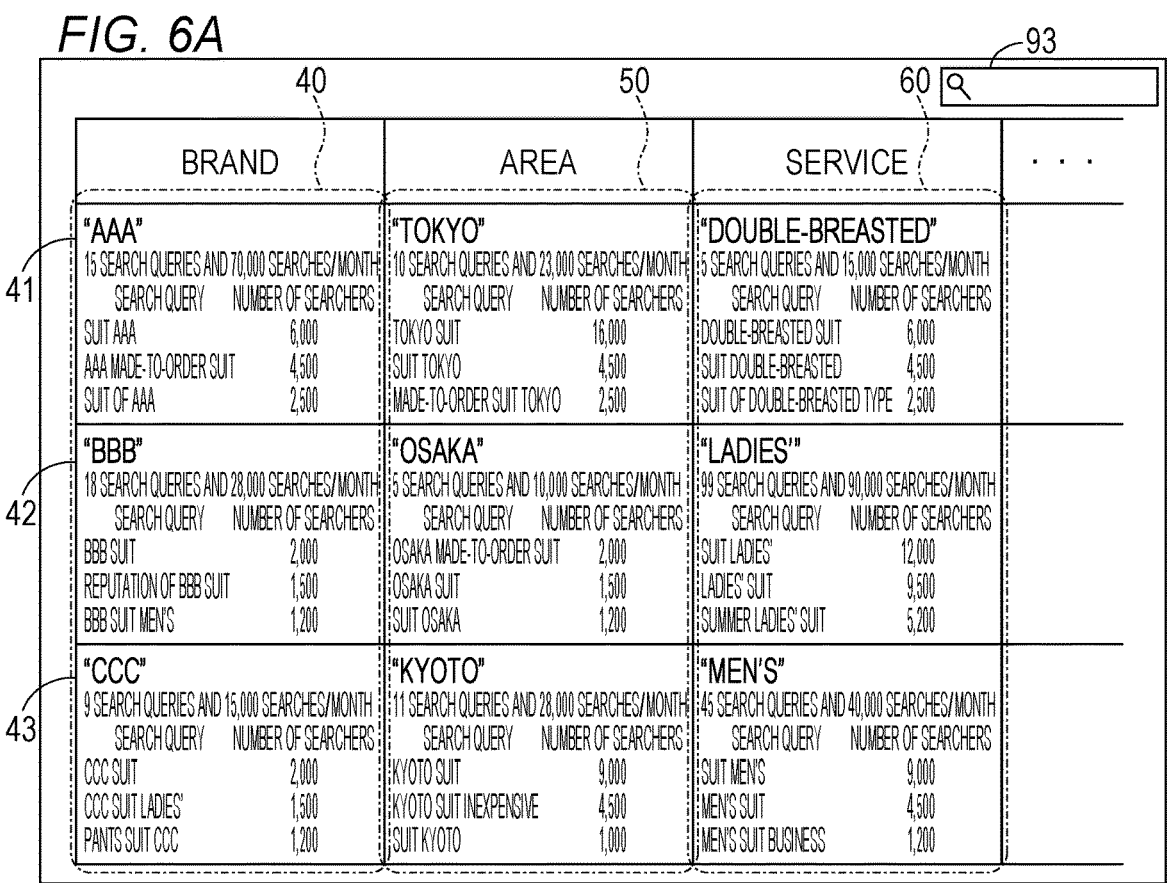

| BRAND (40) | AREA (50) | SERVICE (60) | · · · |
|---|---|---|---|
| "AAA" (41)<br>15 SEARCH QUERIES AND 70,000 SEARCHES/MONTH<br>SEARCH QUERY — NUMBER OF SEARCHERS<br>SUIT AAA — 6,000<br>AAA MADE-TO-ORDER SUIT — 4,500<br>SUIT OF AAA — 2,500 | "TOKYO"<br>10 SEARCH QUERIES AND 23,000 SEARCHES/MONTH<br>SEARCH QUERY — NUMBER OF SEARCHERS<br>TOKYO SUIT — 16,000<br>SUIT TOKYO — 4,500<br>MADE-TO-ORDER SUIT TOKYO — 2,500 | "DOUBLE-BREASTED"<br>5 SEARCH QUERIES AND 15,000 SEARCHES/MONTH<br>SEARCH QUERY — NUMBER OF SEARCHERS<br>DOUBLE-BREASTED SUIT — 6,000<br>SUIT DOUBLE-BREASTED — 4,500<br>SUIT OF DOUBLE-BREASTED TYPE — 2,500 | |
| "BBB" (42)<br>18 SEARCH QUERIES AND 28,000 SEARCHES/MONTH<br>SEARCH QUERY — NUMBER OF SEARCHERS<br>BBB SUIT — 2,000<br>REPUTATION OF BBB SUIT — 1,500<br>BBB SUIT MEN'S — 1,200 | "OSAKA"<br>5 SEARCH QUERIES AND 10,000 SEARCHES/MONTH<br>SEARCH QUERY — NUMBER OF SEARCHERS<br>OSAKA MADE-TO-ORDER SUIT — 2,000<br>OSAKA SUIT — 1,500<br>SUIT OSAKA — 1,200 | "LADIES'"<br>99 SEARCH QUERIES AND 90,000 SEARCHES/MONTH<br>SEARCH QUERY — NUMBER OF SEARCHERS<br>SUIT LADIES' — 12,000<br>LADIES' SUIT — 9,500<br>SUMMER LADIES' SUIT — 5,200 | |
| "CCC" (43)<br>9 SEARCH QUERIES AND 15,000 SEARCHES/MONTH<br>SEARCH QUERY — NUMBER OF SEARCHERS<br>CCC SUIT — 2,000<br>CCC SUIT LADIES' — 1,500<br>PANTS SUIT CCC — 1,200 | "KYOTO"<br>11 SEARCH QUERIES AND 28,000 SEARCHES/MONTH<br>SEARCH QUERY — NUMBER OF SEARCHERS<br>KYOTO SUIT — 9,000<br>KYOTO SUIT INEXPENSIVE — 4,500<br>SUIT KYOTO — 1,000 | "MEN'S"<br>45 SEARCH QUERIES AND 40,000 SEARCHES/MONTH<br>SEARCH QUERY — NUMBER OF SEARCHERS<br>SUIT MEN'S — 9,000<br>MEN'S SUIT — 4,500<br>MEN'S SUIT BUSINESS — 1,200 | |

(93 — search box)

*FIG. 6B*

| BRAND | AREA | SERVICE | · · · |
|---|---|---|---|
| "AAA"<br>15 SEARCH QUERIES AND 70,000 SEARCHES/MONTH<br>SEARCH QUERY — NUMBER OF SEARCHERS<br>SUIT AAA — 6,000<br>AAA MADE-TO-ORDER SUIT — 4,500<br>SUIT OF AAA | | "DOUBLE-BREASTED"<br>5 SEARCH QUERIES AND 15,000 SEARCHES/MONTH<br>SEARCH QUERY — NUMBER OF SEARCHERS<br>DOUBLE-BREASTED SUIT — 6,000<br>SUIT DOUBLE-BREASTED — 4,500<br>SUIT OF DOUBLE-BREASTED TYPE — 2,500 | |
| "BBB"<br>18 SEARCH QUERIES A...<br>SEARCH QUERY<br>BBB SUIT<br>REPUTATION OF BBB S...<br>BBB SUIT MEN'S — 1,200 | "TOKYO" (popup)<br>10 SEARCH QUERIES AND 23,000 SEARCHES/MONTH<br>SEARCH QUERY — NUMBER OF SEARCHERS<br>TOKYO SUIT — 16,000<br>SUIT TOKYO — 4,500<br>MADE-TO-ORDER SUIT TOKYO — 2,500<br><br>D 10,000 SEARCHES/MONTH<br>NUMBER OF SEARCHERS<br>R SUIT — 2,000<br> — 1,500<br>SUIT OSAKA — 1,200 | "LADIES'"<br>99 TAILS AND 90,000 SEARCHES/MONTH<br><br>SUIT LADIES' — 12,000<br>LADIES' SUIT — 9,500<br>SUMMER LADIES' SUIT — 5,200 | |
| "CCC"<br>9 SEARCH QUERIES AND 15,000 SEARCHES/MONTH<br>SEARCH QUERY — NUMBER OF SEARCHERS<br>CCC SUIT — 2,000<br>CCC SUIT LADIES' — 1,500<br>PANTS SUIT CCC — 1,200 | "KYOTO"<br>11 SEARCH QUERIES AND 28,000 SEARCHES/MONTH<br>SEARCH QUERY — NUMBER OF SEARCHERS<br>KYOTO SUIT — 9,000<br>KYOTO SUIT INEXPENSIVE — 4,500<br>SUIT KYOTO — 1,000 | "MEN'S"<br>45 SEARCH QUERIES AND 40,000 SEARCHES/MONTH<br>SEARCH QUERY — NUMBER OF SEARCHERS<br>SUIT MEN'S — 9,000<br>MEN'S SUIT — 4,500<br>MEN'S SUIT BUSINESS — 1,200 | |

FIG. 6C

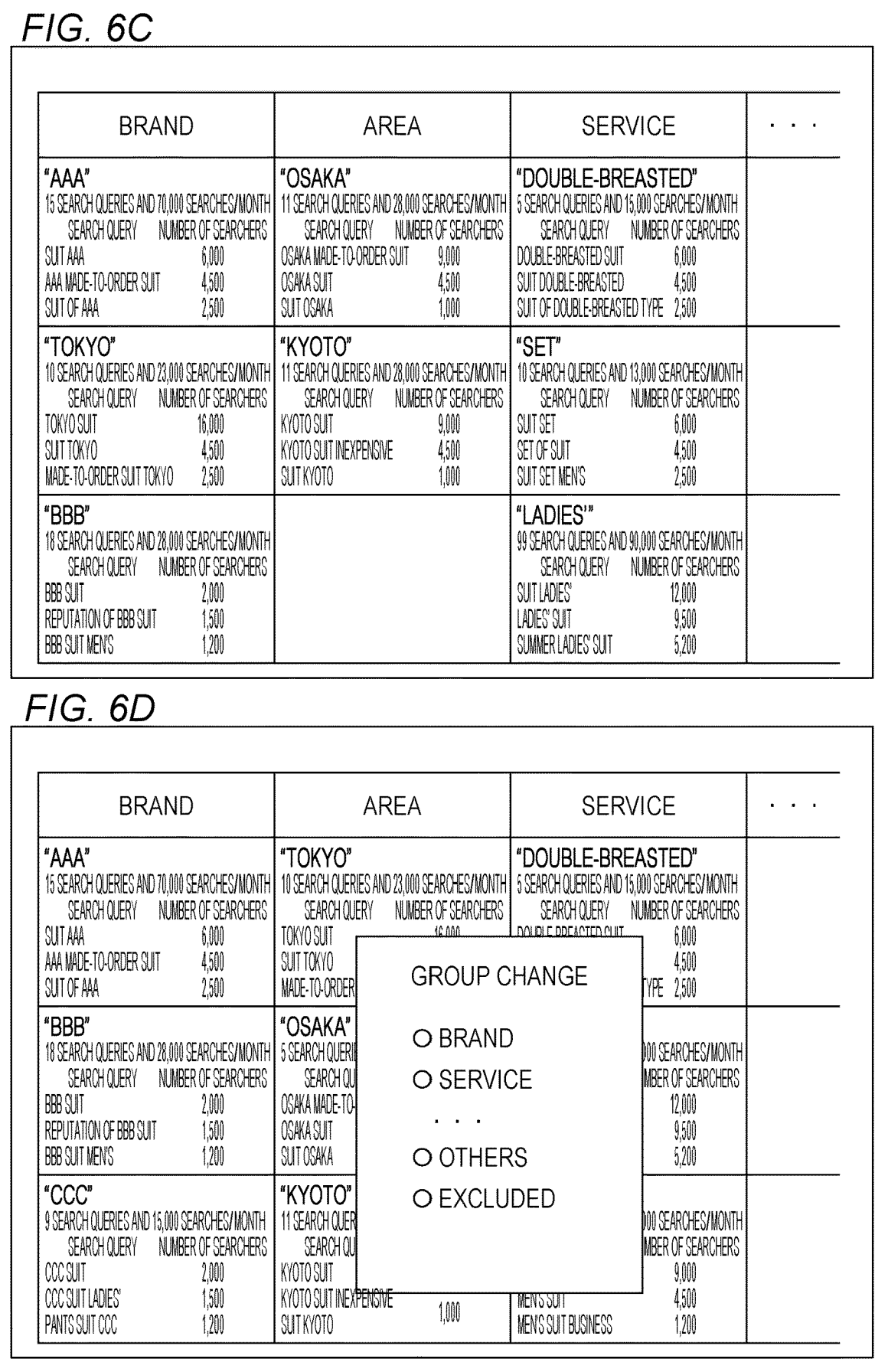

| BRAND | AREA | SERVICE | · · · |
|---|---|---|---|
| "AAA"<br>15 SEARCH QUERIES AND 70,000 SEARCHES/MONTH<br>SEARCH QUERY — NUMBER OF SEARCHERS<br>SUIT AAA — 6,000<br>AAA MADE-TO-ORDER SUIT — 4,500<br>SUIT OF AAA — 2,500 | "OSAKA"<br>11 SEARCH QUERIES AND 28,000 SEARCHES/MONTH<br>SEARCH QUERY — NUMBER OF SEARCHERS<br>OSAKA MADE-TO-ORDER SUIT — 9,000<br>OSAKA SUIT — 4,500<br>SUIT OSAKA — 1,000 | "DOUBLE-BREASTED"<br>5 SEARCH QUERIES AND 15,000 SEARCHES/MONTH<br>SEARCH QUERY — NUMBER OF SEARCHERS<br>DOUBLE-BREASTED SUIT — 6,000<br>SUIT DOUBLE-BREASTED — 4,500<br>SUIT OF DOUBLE-BREASTED TYPE — 2,500 | |
| "TOKYO"<br>10 SEARCH QUERIES AND 23,000 SEARCHES/MONTH<br>SEARCH QUERY — NUMBER OF SEARCHERS<br>TOKYO SUIT — 16,000<br>SUIT TOKYO — 4,500<br>MADE-TO-ORDER SUIT TOKYO — 2,500 | "KYOTO"<br>11 SEARCH QUERIES AND 28,000 SEARCHES/MONTH<br>SEARCH QUERY — NUMBER OF SEARCHERS<br>KYOTO SUIT — 9,000<br>KYOTO SUIT INEXPENSIVE — 4,500<br>SUIT KYOTO — 1,000 | "SET"<br>10 SEARCH QUERIES AND 13,000 SEARCHES/MONTH<br>SEARCH QUERY — NUMBER OF SEARCHERS<br>SUIT SET — 6,000<br>SET OF SUIT — 4,500<br>SUIT SET MEN'S — 2,500 | |
| "BBB"<br>18 SEARCH QUERIES AND 28,000 SEARCHES/MONTH<br>SEARCH QUERY — NUMBER OF SEARCHERS<br>BBB SUIT — 2,000<br>REPUTATION OF BBB SUIT — 1,500<br>BBB SUIT MEN'S — 1,200 | | "LADIES'"<br>99 SEARCH QUERIES AND 90,000 SEARCHES/MONTH<br>SEARCH QUERY — NUMBER OF SEARCHERS<br>SUIT LADIES' — 12,000<br>LADIES' SUIT — 9,500<br>SUMMER LADIES' SUIT — 5,200 | |

FIG. 6D

| BRAND | AREA | SERVICE | · · · |
|---|---|---|---|
| "AAA"<br>15 SEARCH QUERIES AND 70,000 SEARCHES/MONTH<br>SEARCH QUERY — NUMBER OF SEARCHERS<br>SUIT AAA — 6,000<br>AAA MADE-TO-ORDER SUIT — 4,500<br>SUIT OF AAA — 2,500 | "TOKYO"<br>10 SEARCH QUERIES AND 23,000 SEARCHES/MONTH<br>SEARCH QUERY — NUMBER OF SEARCHERS<br>TOKYO SUIT — 16,000<br>SUIT TOKYO<br>MADE-TO-ORDER | "DOUBLE-BREASTED"<br>5 SEARCH QUERIES AND 15,000 SEARCHES/MONTH<br>SEARCH QUERY — NUMBER OF SEARCHERS<br>DOUBLE-BREASTED SUIT — 6,000<br>— 4,500<br>TYPE — 2,500 | |
| "BBB"<br>18 SEARCH QUERIES AND 28,000 SEARCHES/MONTH<br>SEARCH QUERY — NUMBER OF SEARCHERS<br>BBB SUIT — 2,000<br>REPUTATION OF BBB SUIT — 1,500<br>BBB SUIT MEN'S — 1,200 | "OSAKA"<br>5 SEARCH QUERI<br>SEARCH QU<br>OSAKA MADE-TO-<br>OSAKA SUIT<br>SUIT OSAKA | 000 SEARCHES/MONTH<br>MBER OF SEARCHERS<br>12,000<br>9,500<br>5,200 | |
| "CCC"<br>9 SEARCH QUERIES AND 15,000 SEARCHES/MONTH<br>SEARCH QUERY — NUMBER OF SEARCHERS<br>CCC SUIT — 2,000<br>CCC SUIT LADIES' — 1,500<br>PANTS SUIT CCC — 1,200 | "KYOTO"<br>11 SEARCH QUER<br>SEARCH QU<br>KYOTO SUIT<br>KYOTO SUIT INEXPENSIVE<br>SUIT KYOTO — 1,000 | 000 SEARCHES/MONTH<br>MBER OF SEARCHERS<br>9,000<br>4,500<br>MEN'S SUIT BUSINESS — 1,200 | |

GROUP CHANGE

○ BRAND

○ SERVICE

· · ·

○ OTHERS

○ EXCLUDED

FIG. 6E

| BRAND | AREA | SERVICE | · · · |
|---|---|---|---|
| "AAA"<br>15 SEARCH QUERIES AND 70,000 SEARCHES/MONTH<br>SEARCH QUERY — NUMBER OF SEARCHERS<br>SUIT AAA — 6,000<br>AAA MADE-TO-ORDER SUIT — 4,500<br>SUIT OF AAA — 2,500 | KANTO<br>"TOKYO"<br>10 SEARCH QUERIES AND 23,000 SEARCHES/MONTH<br>SEARCH QUERY — NUMBER OF SEARCHERS<br>TOKYO SUIT — 16,000<br>SUIT TOKYO — 4,500<br>MADE-TO-ORDER SUIT TOKYO — 2,500 | "DOUBLE-BREASTED"<br>5 SEARCH QUERIES AND 15,000 SEARCHES/MONTH<br>SEARCH QUERY — NUMBER OF SEARCHERS<br>DOUBLE-BREASTED SUIT — 6,000<br>SUIT DOUBLE-BREASTED — 4,500<br>SUIT OF DOUBLE-BREASTED TYPE — 2,500 | |
| "BBB"<br>18 SEARCH QUERIES AND 28,000 SEARCHES/MONTH<br>SEARCH QUERY — NUMBER OF SEARCHERS<br>BBB SUIT — 2,000<br>REPUTATION OF BBB SUIT — 1,500<br>BBB SUIT MEN'S — 1,200 | KANSAI<br>"OSAKA"<br>5 SEARCH QUERIES AND 10,000 SEARCHES/MONTH<br>SEARCH QUERY — NUMBER OF SEARCHERS<br>OSAKA MADE-TO-ORDER SUIT — 2,000<br>OSAKA SUIT — 1,500<br>SUIT OSAKA — 1,200 | "LADIES'"<br>99 SEARCH QUERIES AND 90,000 SEARCHES/MONTH<br>SEARCH QUERY — NUMBER OF SEARCHERS<br>SUIT LADIES' — 12,000<br>LADIES' SUIT — 9,500<br>SUMMER LADIES' SUIT — 5,200 | |
| "CCC"<br>9 SEARCH QUERIES AND 15,000 SEARCHES/MONTH<br>SEARCH QUERY — NUMBER OF SEARCHERS<br>CCC SUIT — 2,000<br>CCC SUIT LADIES' — 1,500<br>PANTS SUIT CCC — 1,200 | "KYOTO"<br>11 SEARCH QUERIES AND 28,000 SEARCHES/MONTH<br>SEARCH QUERY — NUMBER OF SEARCHERS<br>KYOTO SUIT — 9,000 | "MEN'S"<br>45 SEARCH QUERIES AND 40,000 SEARCHES/MONTH<br>SEARCH QUERY — NUMBER OF SEARCHERS<br>SUIT MEN'S — 9,000<br>MEN'S SUIT — 4,500<br>MEN'S SUIT BUSINESS — 1,200 | |

FIG. 6F

| KEYWORD | TOTAL | | | SEGMENT | | | | | | | | | |
|---|---|---|---|---|---|---|---|---|---|---|---|---|---|
| | | | | BRAND | | | | AREA | | | | ECONOMICAL | | | |
| | ECONOMIC SCALE RANKING | NUMBER OF SEARCH QUERIES | NUMBER OF SEARCHES/ MONTH | NUMBER OF SEARCH QUERIES | | NUMBER OF SEARCHES/MONTH | | NUMBER OF SEARCH QUERIES | | NUMBER OF SEARCHES/MONTH | | NUMBER OF SEARCH QUERIES | | NUMBER OF SEARCHES/MONTH | |
| | | | | NUMBER | PROPORTION | NUMBER | PROPORTION | NUMBER | PROPORTION | NUMBER | PROPORTION | NUMBER | PROPORTION | NUMBER | PROPORTION |
| SUIT | 1ST | 2,100 | 1,900,000 | 400 | 19.05% | 800,000 | 42.11% | 300 | 14.29% | 500,000 | 26.32% | 1,400 | 66.67% | 600,000 | 31.58% |
| SHIRT | 2ND | 1,500 | 2,500,000 | 200 | 13.33% | 450,000 | 18.00% | 250 | 16.67% | 350,000 | 14.00% | 1,050 | 70.00% | 1,700,000 | 68.00% |
| MEN'S | 3RD | 1,600 | 1,000,000 | 1,200 | 75.00% | 700,000 | 70.00% | 200 | 12.50% | 200,000 | 20.00% | 200 | 12.50% | 100,000 | 10.00% |
| - | | | | | | | | | | | | | | | |

FIG. 7A

SUIT SHOP | www.a-suits.com/online

| BRAND | AREA | SERVICE | · · · |
|---|---|---|---|

"AAA"
15 SEARCH QUERIES AND 70,000 SEARCHES/MONTH

| SEARCH QUERY | NUMBER OF SEARCHERS | DISPLAY RANKING |
|---|---|---|
| SUIT AAA | 6,000 | 28TH |
| AAA MADE-TO-ORDER SUIT | 4,500 | 30TH |
| SUIT OF AAA | 2,500 | - |

"TOKYO"
10 SEARCH QUERIES AND 23,000 SEARCHES/MONTH

| SEARCH QUERY | NUMBER OF SEARCHERS | DISPLAY RANKING |
|---|---|---|
| TOKYO SUIT | 16,000 | 1ST |
| SUIT TOKYO | 4,500 | 9TH |
| MADE-TO-ORDER SUIT TOKYO | 2,500 | 10TH |

"DOUBLE-BREASTED"
5 SEARCH QUERIES AND 15,000 SEARCHES/MONTH

| SEARCH QUERY | NUMBER OF SEARCHERS | DISPLAY RANKING |
|---|---|---|
| DOUBLE-BREASTED SUIT | 6,000 | 9TH |
| SUIT DOUBLE-BREASTED | 4,500 | - |
| SUIT OF DOUBLE-BREASTED TYPE | 2,500 | 10TH |

"BBB"
18 SEARCH QUERIES AND 28,000 SEARCHES/MONTH

| SEARCH QUERY | NUMBER OF SEARCHERS | DISPLAY RANKING |
|---|---|---|
| BBB SUIT | 2,000 | - |
| REPUTATION OF BBB SUIT | 1,500 | 22ND |
| BBB SUIT MEN'S | 1,200 | - |

"OSAKA"
5 SEARCH QUERIES AND 10,000 SEARCHES/MONTH

| SEARCH QUERY | NUMBER OF SEARCHERS | DISPLAY RANKING |
|---|---|---|
| OSAKA MADE-TO-ORDER SUIT | 2,000 | 2ND |
| OSAKA SUIT | 1,500 | 5TH |
| SUIT OSAKA | 1,200 | 12TH |

"LADIES'"
99 SEARCH QUERIES AND 90,000 SEARCHES/MONTH

| SEARCH QUERY | NUMBER OF SEARCHERS | DISPLAY RANKING |
|---|---|---|
| SUIT LADIES' | 12,000 | - |
| LADIES' SUIT | 9,500 | 30TH |
| SUMMER LADIES' SUIT | 5,200 | - |

"CCC"
9 SEARCH QUERIES AND 15,000 SEARCHES/MONTH

| SEARCH QUERY | NUMBER OF SEARCHERS | DISPLAY RANKING |
|---|---|---|
| CCC SUIT | 2,000 | - |
| CCC SUIT LADIES' | 1,500 | - |
| PANTS SUIT CCC | 1,200 | - |

"KYOTO"
11 SEARCH QUERIES AND 28,000 SEARCHES/MONTH

| SEARCH QUERY | NUMBER OF SEARCHERS | DISPLAY RANKING |
|---|---|---|
| KYOTO SUIT | 9,000 | 1ST |
| KYOTO SUIT INEXPENSIVE | 4,500 | 6TH |
| SUIT KYOTO | 1,000 | 5TH |

"MEN'S"
45 SEARCH QUERIES AND 40,000 SEARCHES/MONTH

| SEARCH QUERY | NUMBER OF SEARCHERS | DISPLAY RANKING |
|---|---|---|
| SUIT MEN'S | 9,000 | 2ND |
| MEN'S SUIT | 4,500 | 3RD |
| MEN'S SUIT BUSINESS | 1,200 | 11TH |

FIG. 7B

W1: SUIT SHOP | www.a-suits.com/online
W2: SUIT ONLINE | www.b-suits.jp

| BRAND | AREA | · · · |
|---|---|---|

"AAA"
15 SEARCH QUERIES AND 70,000 SEARCHES/MONTH

| SEARCH QUERY | NUMBER OF SEARCHERS | DISPLAY RANKING W1 | W2 |
|---|---|---|---|
| SUIT AAA | 6,000 | 28TH | 1ST |
| AAA MADE-TO-ORDER SUIT | 4,500 | 30TH | 10TH |
| SUIT OF AAA | 2,500 | - | 4TH |

"TOKYO"
10 SEARCH QUERIES AND 23,000 SEARCHES/MONTH

| SEARCH QUERY | NUMBER OF SEARCHERS | DISPLAY RANKING W1 | W2 |
|---|---|---|---|
| TOKYO SUIT | 16,000 | 1ST | 20TH |
| SUIT TOKYO | 4,500 | 9TH | 19TH |
| MADE-TO-ORDER SUIT TOKYO | 2,500 | 10TH | - |

"BBB"
18 SEARCH QUERIES AND 28,000 SEARCHES/MONTH

| SEARCH QUERY | NUMBER OF SEARCHERS | DISPLAY RANKING W1 | W2 |
|---|---|---|---|
| BBB SUIT | 2,000 | - | 6TH |
| REPUTATION OF BBB SUIT | 1,500 | 22ND | 10TH |
| BBB SUIT MEN'S | 1,200 | - | 2ND |

"OSAKA"
5 SEARCH QUERIES AND 10,000 SEARCHES/MONTH

| SEARCH QUERY | NUMBER OF SEARCHERS | DISPLAY RANKING W1 | W2 |
|---|---|---|---|
| OSAKA MADE-TO-ORDER SUIT | 2,000 | 2ND | 9TH |
| OSAKA SUIT | 1,500 | 5TH | 10TH |
| SUIT OSAKA | 1,200 | 12TH | 28TH |

Figures 7C, 8A:
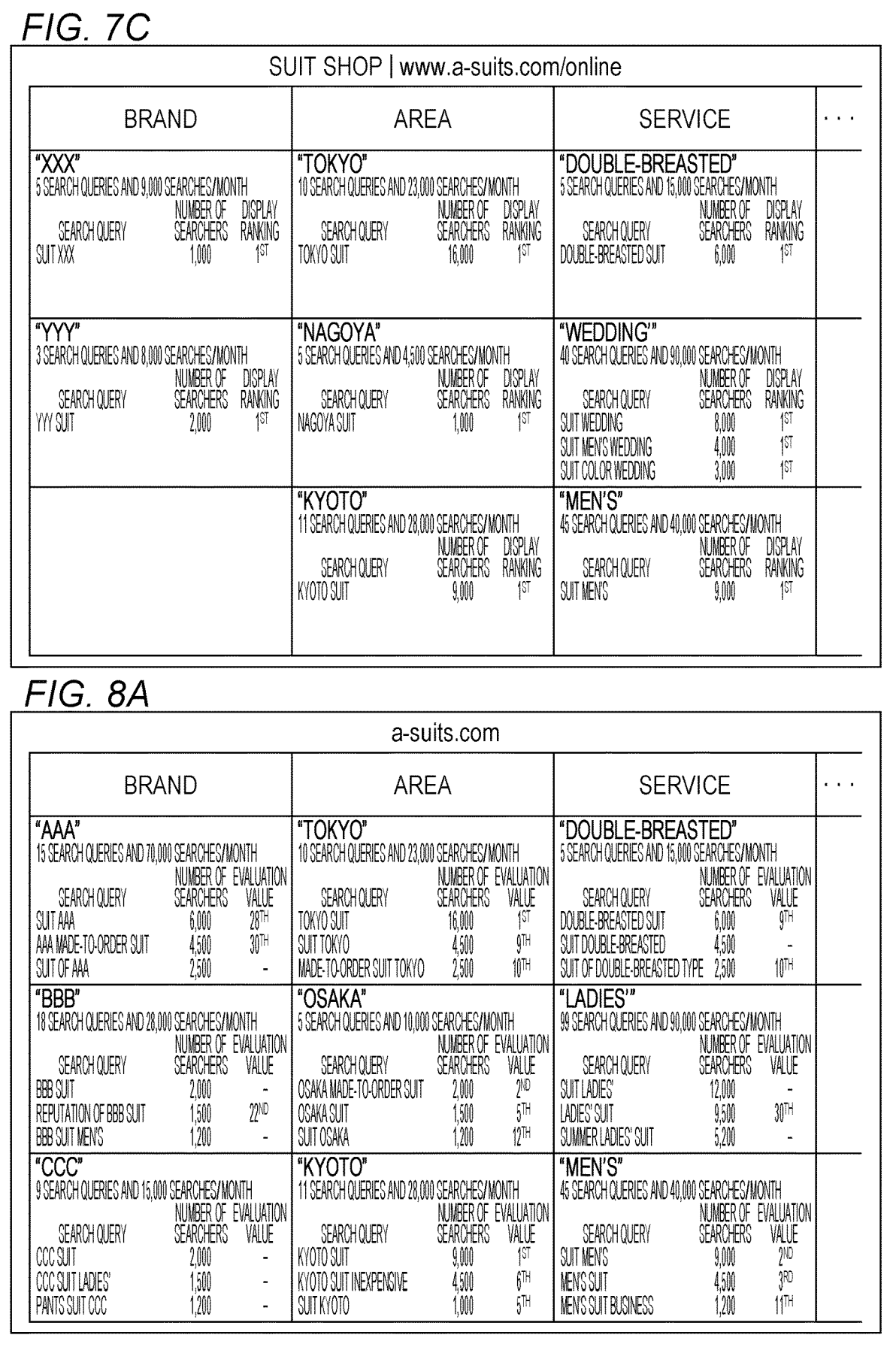

SUIT SHOP | www.a-suits.com/online

| BRAND | AREA | SERVICE | · · · |
|---|---|---|---|
| "XXX" 5 SEARCH QUERIES AND 9,000 SEARCHES/MONTH | "TOKYO" 10 SEARCH QUERIES AND 23,000 SEARCHES/MONTH | "DOUBLE-BREASTED" 5 SEARCH QUERIES AND 15,000 SEARCHES/MONTH | |
| SEARCH QUERY / NUMBER OF SEARCHERS / DISPLAY RANKING<br>SUIT XXX — 1,000 — 1ST | SEARCH QUERY / NUMBER OF SEARCHERS / DISPLAY RANKING<br>TOKYO SUIT — 16,000 — 1ST | SEARCH QUERY / NUMBER OF SEARCHERS / DISPLAY RANKING<br>DOUBLE-BREASTED SUIT — 6,000 — 1ST | |
| "YYY" 3 SEARCH QUERIES AND 8,000 SEARCHES/MONTH | "NAGOYA" 5 SEARCH QUERIES AND 4,500 SEARCHES/MONTH | "WEDDING" 40 SEARCH QUERIES AND 90,000 SEARCHES/MONTH | |
| SEARCH QUERY / NUMBER OF SEARCHERS / DISPLAY RANKING<br>YYY SUIT — 2,000 — 1ST | SEARCH QUERY / NUMBER OF SEARCHERS / DISPLAY RANKING<br>NAGOYA SUIT — 1,000 — 1ST | SEARCH QUERY / NUMBER OF SEARCHERS / DISPLAY RANKING<br>SUIT WEDDING — 8,000 — 1ST<br>SUIT MEN'S WEDDING — 4,000 — 1ST<br>SUIT COLOR WEDDING — 3,000 — 1ST | |
| | "KYOTO" 11 SEARCH QUERIES AND 28,000 SEARCHES/MONTH | "MEN'S" 45 SEARCH QUERIES AND 40,000 SEARCHES/MONTH | |
| | SEARCH QUERY / NUMBER OF SEARCHERS / DISPLAY RANKING<br>KYOTO SUIT — 9,000 — 1ST | SEARCH QUERY / NUMBER OF SEARCHERS / DISPLAY RANKING<br>SUIT MEN'S — 9,000 — 1ST | |

FIG. 8A a-suits.com

| BRAND | AREA | SERVICE | · · · |
|---|---|---|---|
| "AAA" 15 SEARCH QUERIES AND 70,000 SEARCHES/MONTH | "TOKYO" 10 SEARCH QUERIES AND 23,000 SEARCHES/MONTH | "DOUBLE-BREASTED" 5 SEARCH QUERIES AND 15,000 SEARCHES/MONTH | |
| SEARCH QUERY / NUMBER OF SEARCHERS / EVALUATION VALUE<br>SUIT AAA — 6,000 — 28TH<br>AAA MADE-TO-ORDER SUIT — 4,500 — 30TH<br>SUIT OF AAA — 2,500 — – | SEARCH QUERY / NUMBER OF SEARCHERS / EVALUATION VALUE<br>TOKYO SUIT — 16,000 — 1ST<br>SUIT TOKYO — 4,500 — 9TH<br>MADE-TO-ORDER SUIT TOKYO — 2,500 — 10TH | SEARCH QUERY / NUMBER OF SEARCHERS / EVALUATION VALUE<br>DOUBLE-BREASTED SUIT — 6,000 — 9TH<br>SUIT DOUBLE-BREASTED — 4,500 — –<br>SUIT OF DOUBLE-BREASTED TYPE — 2,500 — 10TH | |
| "BBB" 18 SEARCH QUERIES AND 28,000 SEARCHES/MONTH | "OSAKA" 5 SEARCH QUERIES AND 10,000 SEARCHES/MONTH | "LADIES'" 99 SEARCH QUERIES AND 90,000 SEARCHES/MONTH | |
| SEARCH QUERY / NUMBER OF SEARCHERS / EVALUATION VALUE<br>BBB SUIT — 2,000 — –<br>REPUTATION OF BBB SUIT — 1,500 — 22ND<br>BBB SUIT MEN'S — 1,200 — – | SEARCH QUERY / NUMBER OF SEARCHERS / EVALUATION VALUE<br>OSAKA MADE-TO-ORDER SUIT — 2,000 — 2ND<br>OSAKA SUIT — 1,500 — 5TH<br>SUIT OSAKA — 1,200 — 12TH | SEARCH QUERY / NUMBER OF SEARCHERS / EVALUATION VALUE<br>SUIT LADIES' — 12,000 — –<br>LADIES' SUIT — 9,500 — 30TH<br>SUMMER LADIES' SUIT — 5,200 — – | |
| "CCC" 9 SEARCH QUERIES AND 15,000 SEARCHES/MONTH | "KYOTO" 11 SEARCH QUERIES AND 28,000 SEARCHES/MONTH | "MEN'S" 45 SEARCH QUERIES AND 40,000 SEARCHES/MONTH | |
| SEARCH QUERY / NUMBER OF SEARCHERS / EVALUATION VALUE<br>CCC SUIT — 2,000 — –<br>CCC SUIT LADIES' — 1,500 — –<br>PANTS SUIT CCC — 1,200 — – | SEARCH QUERY / NUMBER OF SEARCHERS / EVALUATION VALUE<br>KYOTO SUIT — 9,000 — 1ST<br>KYOTO SUIT INEXPENSIVE — 4,500 — 6TH<br>SUIT KYOTO — 1,000 — 5TH | SEARCH QUERY / NUMBER OF SEARCHERS / EVALUATION VALUE<br>SUIT MEN'S — 9,000 — 2ND<br>MEN'S SUIT — 4,500 — 3RD<br>MEN'S SUIT BUSINESS — 1,200 — 11TH | |

FIG. 8B a-suits.com

| BRAND | AREA | SERVICE | . . . |
|---|---|---|---|
| "AAA"<br>15 SEARCH QUERIES AND 70,000 SEARCHES/MONTH<br><br>SEARCH QUERY / NUMBER OF SEARCHERS / EVALUATION VALUE<br>SUIT AAA — 6,000 — 28TH<br>AAA MADE-TO-ORDER SUIT — 4,500 — 30TH<br>SUIT OF AAA — 2,500 — - | "TOKYO"<br>10 SEARCH QUERIES AND 23,000 SEARCHES/MONTH<br><br>SEARCH QUERY / NUMBER OF SEARCHERS / EVALUATION VALUE<br>TOKYO SUIT — 16,000 — 1ST<br>SUIT TOKYO<br>MADE-TO-ORD... | "DOUBLE-BREASTED"<br>5 SEARCH QUERIES AND 15,000 SEARCHES/MONTH<br><br>SEARCH QUERY / NUMBER OF SEARCHERS / EVALUATION VALUE<br>DOUBLE-BREASTED SUIT — 6,000 — 9TH | |
| "BBB"<br>18 SEARCH QUERIES AND 28,000 SEARCHES/MONTH<br><br>SEARCH QUERY / NUMBER OF SEARCHERS / EVALUATION VALUE<br>BBB SUIT — 2,000 — -<br>REPUTATION OF BBB SUIT — 1,500 — 22ND<br>BBB SUIT MEN'S — 1,200 — - | "OSAKA"<br>5 SEARCH QU...<br><br>OSAKA MADE-TO-ORDER SUIT — 2,000 — 2ND<br>OSAKA SUIT — 1,500 — 5TH<br>SUIT OSAKA — 1,200 — 12TH | "LADIES'"<br>SUIT LADIES' — 12,000 — -<br>LADIES' SUIT — 9,500 — 30TH<br>SUMMER LADIES' SUIT — 5,200 — - | |
| "CCC"<br>9 SEARCH QUERIES AND 15,000 SEARCHES/MONTH<br><br>SEARCH QUERY / NUMBER OF SEARCHERS / EVALUATION VALUE<br>CCC SUIT — 2,000 — -<br>CCC SUIT LADIES' — 1,500 — -<br>PANTS SUIT CCC — 1,200 — - | "KYOTO"<br>11 SEARCH QUERIES AND 28,000 SEARCHES/MONTH<br><br>SEARCH QUERY / NUMBER OF SEARCHERS / EVALUATION VALUE<br>KYOTO SUIT — 9,000 — 1ST<br>KYOTO SUIT INEXPENSIVE — 4,500 — 6TH<br>SUIT KYOTO — 1,000 — 5TH | "MEN'S"<br>45 SEARCH QUERIES AND 40,000 SEARCHES/MONTH<br><br>SEARCH QUERY / NUMBER OF SEARCHERS / EVALUATION VALUE<br>SUIT MEN'S — 9,000 — 2ND<br>MEN'S SUIT — 4,500 — 3RD<br>MEN'S SUIT BUSINESS — 1,200 — 11TH | |

Popup box (overlaid):

| URL | SEARCH RANKING | CLICK THROUGH NUMBER |
|---|---|---|
| a-suits.com/tokyo | 2ND | 3,000 |
| a-suits.com/tokyo-suits | 3RD | 2,000 |

FIG. 8C a-suits.com

Popup box (overlaid):
- a-suits.com/online
- a-suits.com/tokyo

| BRAND | AREA | SERVICE | . . . |
|---|---|---|---|
| "AAA"<br>15 SEARCH QUERIES AND 70,000 SEARCHES/MONTH<br><br>SEARCH QUERY / NUMBER OF SEARCHERS / EVALUATION VALUE<br>SUIT AAA — 6,000 — 28TH<br>AAA MADE-TO-ORDER SUIT — 4,500 — 30TH<br>SUIT OF AAA — 2,500 — - | "TOKYO"<br>10 SEARCH QUERIES AND 23,000 SEARCHES/MONTH<br><br>SEARCH QUERY / NUMBER OF SEARCHERS / EVALUATION VALUE<br>TOKYO SUIT — 16,000 — 1ST<br>SUIT TOKYO — 4,500 — 9TH<br>MADE-TO-ORDER SUIT TOKYO — 2,500 — 10TH | "DOUBLE-BREASTED"<br>5 SEARCH QUERIES AND 15,000 SEARCHES/MONTH<br><br>SEARCH QUERY / NUMBER OF SEARCHERS / EVALUATION VALUE<br>DOUBLE-BREASTED SUIT — 6,000 — 9TH<br>SUIT DOUBLE-BREASTED — 4,500 — -<br>SUIT OF DOUBLE-BREASTED TYPE — 2,500 — 10TH | |
| "BBB"<br>18 SEARCH QUERIES AND 28,000 SEARCHES/MONTH<br><br>SEARCH QUERY / NUMBER OF SEARCHERS / EVALUATION VALUE<br>BBB SUIT — 2,000 — -<br>REPUTATION OF BBB SUIT — 1,500 — 22ND<br>BBB SUIT MEN'S — 1,200 — - | "OSAKA"<br>5 SEARCH QUERIES AND 10,000 SEARCHES/MONTH<br><br>SEARCH QUERY / NUMBER OF SEARCHERS / EVALUATION VALUE<br>OSAKA MADE-TO-ORDER SUIT — 2,000 — 2ND<br>OSAKA SUIT — 1,500 — 5TH<br>SUIT OSAKA — 1,200 — 12TH | "LADIES'"<br>99 SEARCH QUERIES AND 90,000 SEARCHES/MONTH<br><br>SEARCH QUERY / NUMBER OF SEARCHERS / EVALUATION VALUE<br>SUIT LADIES' — 12,000 — -<br>LADIES' SUIT — 9,500 — 30TH<br>SUMMER LADIES' SUIT — 5,200 — - | |
| "CCC"<br>9 SEARCH QUERIES AND 15,000 SEARCHES/MONTH<br><br>SEARCH QUERY / NUMBER OF SEARCHERS / EVALUATION VALUE<br>CCC SUIT — 2,000 — -<br>CCC SUIT LADIES' — 1,500 — -<br>PANTS SUIT CCC — 1,200 — - | "KYOTO"<br>11 SEARCH QUERIES AND 28,000 SEARCHES/MONTH<br><br>SEARCH QUERY / NUMBER OF SEARCHERS / EVALUATION VALUE<br>KYOTO SUIT — 9,000 — 1ST<br>KYOTO SUIT INEXPENSIVE — 4,500 — 6TH<br>SUIT KYOTO — 1,000 — 5TH | "MEN'S"<br>45 SEARCH QUERIES AND 40,000 SEARCHES/MONTH<br><br>SEARCH QUERY / NUMBER OF SEARCHERS / EVALUATION VALUE<br>SUIT MEN'S — 9,000 — 2ND<br>MEN'S SUIT — 4,500 — 3RD<br>MEN'S SUIT BUSINESS — 1,200 — 11TH | |

FIG. 9

| SUIT SHOP \| www.a-suits.com/online | | |
|---|---|---|
| BRAND | · · · | |

"XXX"
5 SEARCH QUERIES AND 13,000 SEARCHES/MONTH     0.56%     TRAFFIC OF 73

| SEARCH QUERY | NUMBER OF SEARCHERS | DISPLAY RANKING | CLICK THROUGH RATE | CLICK THROUGH NUMBER |
|---|---|---|---|---|
| SUIT XXX | 6,000 | 9TH | 1.00% | 60 |
| SUIT MADE BY XXX | 4,500 | – | 0.00% | 0 |
| SUIT OF XXX | 2,400 | 10TH | 0.50% | 13 |

| SUIT SHOP \| www.a-suits.com/online | | | |
|---|---|---|---|

| BRAND | NUMBER OF SEARCHES 113,000<br>CLICK THROUGH NUMBER 0<br>CLICK THROUGH RATE 0% | AREA | NUMBER OF SEARCHES 61,000<br>CLICK THROUGH NUMBER 6,450<br>CLICK THROUGH RATE 11% | SERVICE | NUMBER OF SEARCHES 145,000<br>CLICK THROUGH NUMBER 3,150<br>CLICK THROUGH RATE 2.1% | · · · |
|---|---|---|---|---|---|---|

"AAA"
15 SEARCH QUERIES AND 70,000 SEARCHES/MONTH

| SEARCH QUERY | NUMBER OF SEARCHERS | DISPLAY RANKING |
|---|---|---|
| SUIT AAA | 6,000 | 28TH |
| AAA MADE-TO-ORDER SUIT | 4,500 | 30TH |
| SUIT OF AAA | 2,500 | – |

"TOKYO"
10 SEARCH QUERIES AND 23,000 SEARCHES/MONTH

| SEARCH QUERY | NUMBER OF SEARCHERS | DISPLAY RANKING |
|---|---|---|
| TOKYO SUIT | 16,000 | 1ST |
| SUIT TOKYO | 4,500 | 9TH |
| MADE-TO-ORDER SUIT TOKYO | 2,500 | 10TH |

"DOUBLE-BREASTED"
5 SEARCH QUERIES AND 15,000 SEARCHES/MONTH

| SEARCH QUERY | NUMBER OF SEARCHERS | DISPLAY RANKING |
|---|---|---|
| DOUBLE-BREASTED SUIT | 6,000 | 9TH |
| SUIT DOUBLE-BREASTED | 4,500 | – |
| SUIT OF DOUBLE-BREASTED TYPE | 2,500 | 10TH |

"BBB"
18 SEARCH QUERIES AND 28,000 SEARCHES/MONTH

| SEARCH QUERY | NUMBER OF SEARCHERS | DISPLAY RANKING |
|---|---|---|
| BBB SUIT | 2,000 | – |
| REPUTATION OF BBB SUIT | 1,500 | 22ND |
| BBB SUIT MEN'S | 1,200 | – |

"OSAKA"
5 SEARCH QUERIES AND 10,000 SEARCHES/MONTH

| SEARCH QUERY | NUMBER OF SEARCHERS | DISPLAY RANKING |
|---|---|---|
| OSAKA MADE-TO-ORDER SUIT | 2,000 | 2ND |
| OSAKA SUIT | 1,500 | 5TH |
| SUIT OSAKA | 1,200 | 12TH |

"LADIES'"
99 SEARCH QUERIES AND 90,000 SEARCHES/MONTH

| SEARCH QUERY | NUMBER OF SEARCHERS | DISPLAY RANKING |
|---|---|---|
| SUIT LADIES' | 12,000 | – |
| LADIES' SUIT | 9,500 | 30TH |
| SUMMER LADIES' SUIT | 5,200 | – |

"CCC"
9 SEARCH QUERIES AND 15,000 SEARCHES/MONTH

| SEARCH QUERY | NUMBER OF SEARCHERS | DISPLAY RANKING |
|---|---|---|
| CCC SUIT | 2,000 | – |
| CCC SUIT LADIES' | 1,500 | – |
| PANTS SUIT CCC | 1,200 | – |

"KYOTO"
11 SEARCH QUERIES AND 28,000 SEARCHES/MONTH

| SEARCH QUERY | NUMBER OF SEARCHERS | DISPLAY RANKING |
|---|---|---|
| KYOTO SUIT | 9,000 | 1ST |
| KYOTO SUIT INEXPENSIVE | 4,500 | 6TH |
| SUIT KYOTO | 1,000 | 5TH |

"MEN'S"
45 SEARCH QUERIES AND 40,000 SEARCHES/MONTH

| SEARCH QUERY | NUMBER OF SEARCHERS | DISPLAY RANKING |
|---|---|---|
| SUIT MEN'S | 9,000 | 2ND |
| MEN'S SUIT | 4,500 | 3RD |
| MEN'S SUIT BUSINESS | 1,200 | 11TH |

FIG. 10B

| SUIT SHOP \| www.a-suits.com/online | | | |
|---|---|---|---|
| AREA<br>NUMBER OF SEARCHES 61,000<br>CLICK THROUGH NUMBER 6,450<br>CLICK THROUGH RATE 11% | SERVICE<br>NUMBER OF SEARCHES 145,000<br>CLICK THROUGH NUMBER 3,150<br>CLICK THROUGH RATE 2.1% | BRAND<br>NUMBER OF SEARCHES 113,000<br>CLICK THROUGH NUMBER 0<br>CLICK THROUGH RATE 0% | · · · |
| "TOKYO"<br>10 SEARCH QUERIES AND 23,000 SEARCHES/MONTH | "DOUBLE-BREASTED"<br>5 SEARCH QUERIES AND 15,000 SEARCHES/MONTH | "AAA"<br>15 SEARCH QUERIES AND 70,000 SEARCHES/MONTH | |
| SEARCH QUERY / NUMBER OF SEARCHERS / DISPLAY RANKING<br>TOKYO SUIT   16,000   1ST<br>SUIT TOKYO   4,500   9TH<br>MADE-TO-ORDER SUIT TOKYO   2,500   10TH | SEARCH QUERY / NUMBER OF SEARCHERS / DISPLAY RANKING<br>DOUBLE-BREASTED SUIT   6,000   9TH<br>SUIT DOUBLE-BREASTED   4,500   -<br>SUIT OF DOUBLE-BREASTED TYPE   2,500   10TH | SEARCH QUERY / NUMBER OF SEARCHERS / DISPLAY RANKING<br>SUIT AAA   6,000   28TH<br>AAA MADE-TO-ORDER SUIT   4,500   30TH<br>SUIT OF AAA   2,500   - | |
| "OSAKA"<br>5 SEARCH QUERIES AND 10,000 SEARCHES/MONTH | "LADIES'"<br>99 SEARCH QUERIES AND 90,000 SEARCHES/MONTH | "BBB"<br>18 SEARCH QUERIES AND 28,000 SEARCHES/MONTH | |
| SEARCH QUERY / NUMBER OF SEARCHERS / DISPLAY RANKING<br>OSAKA MADE-TO-ORDER SUIT   2,000   2ND<br>OSAKA SUIT   1,500   5TH<br>SUIT OSAKA   1,200   12TH | SEARCH QUERY / NUMBER OF SEARCHERS / DISPLAY RANKING<br>SUIT LADIES'   12,000   -<br>LADIES' SUIT   9,500   30TH<br>SUMMER LADIES' SUIT   5,200   - | SEARCH QUERY / NUMBER OF SEARCHERS / DISPLAY RANKING<br>BBB SUIT   2,000   -<br>REPUTATION OF BBB SUIT   1,500   22ND<br>BBB SUIT MEN'S   1,200   - | |
| "KYOTO"<br>11 SEARCH QUERIES AND 28,000 SEARCHES/MONTH | "MEN'S"<br>45 SEARCH QUERIES AND 40,000 SEARCHES/MONTH | "CCC"<br>9 SEARCH QUERIES AND 15,000 SEARCHES/MONTH | |
| SEARCH QUERY / NUMBER OF SEARCHERS / DISPLAY RANKING<br>KYOTO SUIT   9,000   1ST<br>KYOTO SUIT INEXPENSIVE   4,500   6TH<br>SUIT KYOTO   1,000   5TH | SEARCH QUERY / NUMBER OF SEARCHERS / DISPLAY RANKING<br>SUIT MEN'S   9,000   2ND<br>MEN'S SUIT   4,500   3RD<br>MEN'S SUIT BUSINESS   1,200   11TH | SEARCH QUERY / NUMBER OF SEARCHERS / DISPLAY RANKING<br>CCC SUIT   2,000   -<br>CCC SUIT LADIES'   1,500   -<br>PANTS SUIT CCC   1,200   - | |

FIG. 11

"SERVICE"

| RANKING | WEBPAGE | CLICK THROUGH NUMBER |
|---|---|---|
| 1 | www.aaa.com | 200,000 |
| 2 | www.bbb.com | 150,000 |
| 3 | www.ccc.com | 19,000 |

*FIG. 12*

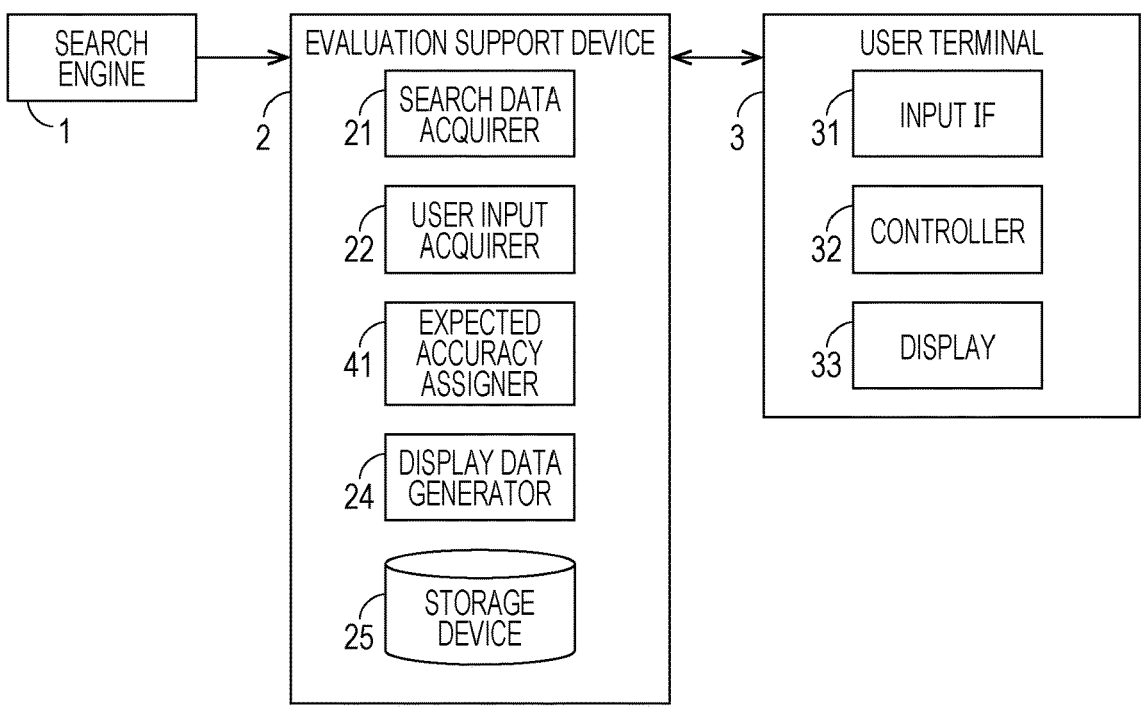

*FIG. 13*

| SEGMENT | BRAND | AREA | SERVICE | ECONOMICAL | OPINION |
|---|---|---|---|---|---|
| SCORE | 8 | 3 | 1 | 5 | 3 |

*FIG. 14*

| TOTAL VALUE | 0 | 1 TO 4 | 5 TO 7 | 8 TO 12 | 13 OR MORE |
|---|---|---|---|---|---|
| EXPECTED ACCURACY | 1 | 2 | 3 | 4 | 3 |

*FIG. 15*

| | BRAND | AREA | SERVICE |
|---|---|---|---|
| EXPECTED ACCURACY 5 | SUIT AAA INEXPENSIVE TOKYO YOKOHAMA SUIT AAA SALE DISCOUNT | – | – |
| EXPECTED ACCURACY 4 | SUIT BBB KYOTO | – | – |
| EXPECTED ACCURACY 3 | – | SUIT OSAKA SUIT TOKYO | – |
| EXPECTED ACCURACY 2 | – | SUIT OSAKA MADE-TO-ORDER SUIT | MEN'S SUIT LADIES' SUIT |
| EXPECTED ACCURACY 1 | SUIT CCC | – | SUIT |

FIG. 16

| BRAND | | AREA | | SERVICE | | · · · |
|---|---|---|---|---|---|---|
| SUIT AAA | 6,000 | TOKYO SUIT | 16,000 | SUIT LADIES' | 12,000 | |
| AAA MADE-TO-ORDER SUIT | 4,500 | KYOTO SUIT | 9,000 | LADIES' SUIT | 9,500 | |
| SUIT OF AAA | 2,500 | SUIT TOKYO | 4,500 | SUIT MEN'S | 9,000 | |
| BBB SUIT | 2,000 | KYOTO SUIT INEXPENSIVE | 4,500 | DOUBLE-BREASTED SUIT | 6,000 | |
| CCC SUIT | 2,000 | MADE-TO-ORDER SUIT TOKYO | 2,500 | SUMMER LADIES' SUIT | 5,200 | |
| REPUTATION OF BBB SUIT | 1,500 | OSAKA MADE-TO-ORDER SUIT | 2,000 | SUIT DOUBLE-BREASTED | 4,500 | |
| CCC SUIT LADIES' | 1,500 | OSAKA SUIT | 1,500 | MEN'S SUIT | 4,500 | |
| BBB SUIT MEN'S | 1,200 | SUIT OSAKA | 1,200 | SUIT OF DOUBLE-BREASTED TYPE | 2,500 | |
| PANTS SUIT CCC | 1,200 | SUIT KYOTO | 1,000 | MEN'S SUIT BUSINESS | 1,200 | |

FIG. 17

| BRAND | AREA | SERVICE | · · · |
|---|---|---|---|
| "AAA" | "TOKYO" | "DOUBLE-BREASTED" | |
| "BBB" | "OSAKA" | "LADIES'" | |
| "CCC" | "KYOTO" | "MEN'S" | |

FIG. 18

| EXPECTED ACCURACY 5 | EXPECTED ACCURACY 4 | EXPECTED ACCURACY 3 | EXPECTED ACCURACY 2 | EXPECTED ACCURACY 1 |
|---|---|---|---|---|
| SUIT AAA INEXPENSIVE TOKYO YOKOHAMA SUIT AAA SALE DISCOUNT | SUIT BBB KYOTO | SUIT OSAKA SUIT TOKYO | SUIT OSAKA MADE-TO-ORDER SUIT MEN'S SUIT LADIES' SUIT | SUIT CCC SUIT |

FIG. 19

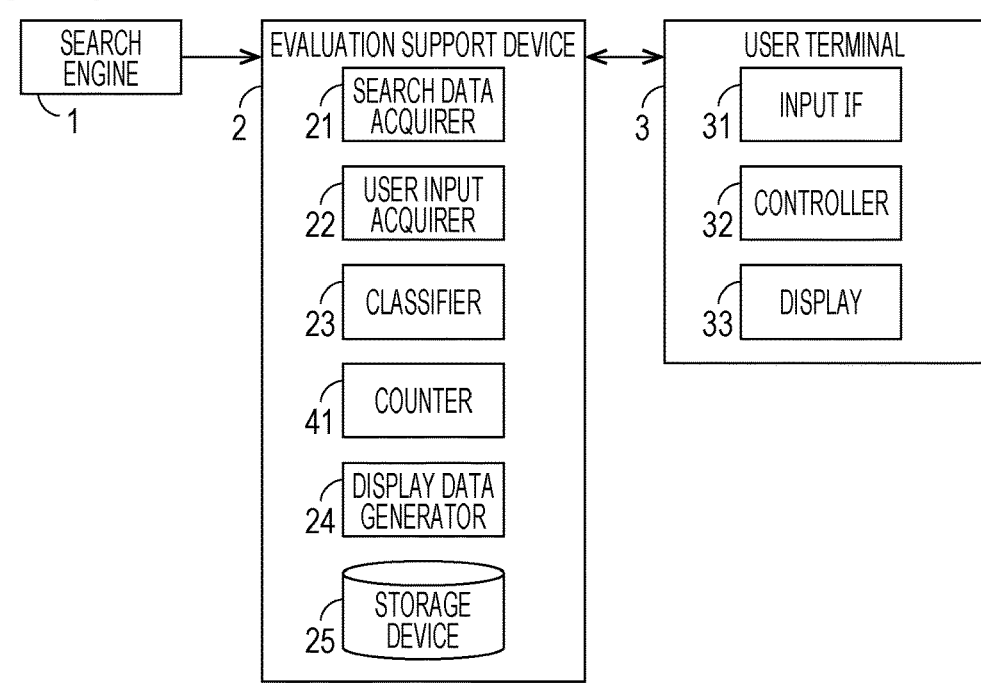

FIG. 20

| SEARCH QUERY | 1ST | 2ND | 3RD | NUMBER OF SEARCHES |
|---|---|---|---|---|
| SUIT AAA | W1 | W3 | W4 | 200,000 |
| TOKYO SUIT | W2 | W5 | W6 | 100,000 |
| DOUBLE-BREASTED SUIT | W7 | W1 | W2 | 50,000 |
| BBB SUIT | W1 | W8 | W2 | 30,000 |
| SUIT OSAKA | W2 | W9 | W1 | 80,000 |

FIG. 21

| SEGMENT | SEARCH QUERY | 1ST | 2ND | 3RD | NUMBER OF SEARCHES |
|---|---|---|---|---|---|
| BRAND | SUIT AAA | W1 | W3 | W4 | 200,000 |
|  | BBB SUIT | W1 | W8 | W2 | 30,000 |
| AREA | TOKYO SUIT | W2 | W5 | W6 | 100,000 |
|  | SUIT OSAKA | W2 | W9 | W1 | 80,000 |
| SERVICE | DOUBLE-BREASTED SUIT | W7 | W1 | W2 | 50,000 |

FIG. 22

|          | W1              | W2              |
|----------|-----------------|-----------------|
| BRAND    | 57,500 (86%)    | 1,500 (3%)      |
| AREA     | 4,000 (6%)      | 45,000 (92%)    |
| SERVICE  | 5,000 (8%)      | 2,500 (5%)      |

FIG. 23

| JOB CHANGE | |
|-----------|--------------------------|
| SEARCH QUERY | NUMBER OF SEARCHES/ MONTH |
| JOB CHANGE TOKYO | 2,000 |
| JOB CHANGE OSAKA | 1,500 |
| JOB CHANGE HOMETOWN | 800 |
| JOB CHANGE A COMPANY | 600 |
| JOB CHANGE SITE | 100 |

| JOB OFFER | |
|-----------|--------------------------|
| SEARCH QUERY | NUMBER OF SEARCHES/ MONTH |
| JOB OFFER TOKYO | 500 |
| JOB OFFER A COMPANY | 1,000 |
| JOB OFFER B COMPANY | 1,500 |
| JOB OFFER C COMPANY | 500 |

FIG. 24

| JOB CHANGE | | |
|---|---|---|
| SEARCH QUERY | NUMBER OF SEARCHES/ MONTH | CLASSIFICATION |
| JOB CHANGE TOKYO | 2,000 | AREA |
| JOB CHANGE OSAKA | 1,500 | AREA |
| JOB CHANGE HOMETOWN | 800 | AREA |
| JOB CHANGE A COMPANY | 600 | BRAND |
| JOB CHANGE SITE | 100 | SERVICE |

| JOB OFFER | | |
|---|---|---|
| SEARCH QUERY | NUMBER OF SEARCHES/ MONTH | CLASSIFICATION |
| JOB OFFER TOKYO | 500 | AREA |
| JOB OFFER A COMPANY | 1,000 | BRAND |
| JOB OFFER B COMPANY | 1,500 | BRAND |
| JOB OFFER C COMPANY | 500 | BRAND |

FIG. 25A

NUMBER OF SEARCH QUERIES

| | JOB CHANGE | JOB OFFER |
|---|---|---|
| BRAND | 20% | 75% |
| AREA | 60% | 25% |
| SERVICE | 20% | 0% |

*FIG. 25B*

NUMBER OF SEARCHES

|         | JOB CHANGE | JOB OFFER |
|---------|------------|-----------|
| BRAND   | 12%        | 86%       |
| AREA    | 86%        | 14%       |
| SERVICE | 2%         | 0%        |

EVALUATION SUPPORT PROGRAM, EVALUATION SUPPORT METHOD, AND EVALUATION SUPPORT DEVICE

TECHNICAL FIELD

The present invention relates to an evaluation support program, an evaluation support method, and an evaluation support device.

BACKGROUND ART

In evaluating a trend of attracting visitors to a website, it is difficult to quickly discriminate search queries that contribute to attracting visitors and search queries that do not contribute to attracting visitors for each search need (hereinafter referred to as a segment).

Specifically, it is necessary to imagine and infer a segment for which the content of each of a large number of web pages in a web site is suitable. Furthermore, in a case of actually inputting a large number of search queries listed in this manner to a search engine one by one, it is necessary to check search results visually each time and to check the display ranking of each web page to infer whether or not a corresponding web page is suitable for each segment.

In addition, it is not easy to subjectively segment various search queries while checking each search query visually, or to select a web page that seems to be suitable for each segment.

Note that the present applicant does not know the inventions disclosed in documents related to the present invention.

SUMMARY OF INVENTION

Technical Problem

An object of the present invention is to provide an evaluation support program, an evaluation support method, and an evaluation support device capable of evaluating a relationship between a web page or a web site and a search segment.

Solution to the Problem

According to one aspect of the present invention, there is provided an evaluation support program that causes a computer to function as: a search data acquisition means configured to acquire a search query including one or more words; a classification means configured to classify each search query into any of a plurality of segments based on the one or more words; and a display data generation means configured to generate display data for displaying which of the plurality of segments at least a part of the search query is classified into.

The classification means may classify a search query classified into one segment into any of a plurality of sub segments, and the display data generation means may generate display data for displaying which of the plurality of sub segments at least a part of the search query is classified into.

The classification means may classify a search query classified into one segment into any of a plurality of sub segments based on the one or more words included in each search query.

The classification means may classify search queries including a common word into an identical sub segment.

The classification means may classify a search query classified into one segment into any of a plurality of sub segments based on an economic scale of the search query.

The display data generation means may generate display data for displaying, on a display, a screen in which display field groups in which display fields associated with sub segments belonging to one segment are arranged in a first direction are arranged in a second direction, and evaluation information according to a search result for a search query classified into an associated sub segment is displayed in each display field.

The classification means may be configured to classify each search query into any of the plurality of segments and classify a search query classified into one segment into any of the plurality of sub segments, and then change a sub segment belonging to a certain segment in such a way as to belong to another segment based on a user operation.

The search data acquisition means may acquire, from a search engine, search data indicating a relationship between the search query, a web page included in a search result for each search query, and a display ranking of the web page, and the display data generation means may generate display data for displaying, on the display, a screen including evaluation information according to a search result for a search query classified into the segment for each segment, for a specific web page or an evaluation target unit including a plurality of web pages, based on the search data.

The evaluation target unit may be a domain.

The classification means may classify a search query classified into one segment into any of the plurality of sub segments, and the display data generation means may generate the display data for displaying, on the display, a screen including evaluation information according to a search result for a search query classified into the sub segment for each sub segment, for the specific web page or the evaluation target unit.

The display data may be data for the specific web page, and the evaluation information according to the search result may be a display ranking of the specific web page included in the search result for the search query classified into the segment.

The number of specific web pages may be plural, and the evaluation information according to the search result may include a display ranking of each of the plurality of specific web pages.

The display data may be data for the evaluation target unit, and the evaluation information according to the search result may be a ranking of a click-through number for a web page included in the evaluation target unit.

The number of evaluation target units may be plural, and the evaluation information according to the search result may include a ranking of a click-through number for each of the plurality of evaluation target units.

The click-through number may be based on a display ranking of one or more web pages included in the evaluation target unit among web pages included in the search result.

The display data generation means may generate the display data for displaying, on the display, a screen including the evaluation information of the specific web page or the evaluation target unit for the segment based on the search result for the search query classified into the segment and the number of searches for the search query.

The evaluation information for the segment may be an evaluation value corresponding to a click-through number from the search query classified into the segment based on the search result for the search query classified into the segment and the number of searches for the search query.

The display data generation means may generate the display data for displaying the segments in an order according to the evaluation information.

The display data generation means may acquire, for a plurality of web pages or a plurality of evaluation target units, the evaluation information of the specific web page or the evaluation target unit for the segment based on the search result for the search query classified into the segment and the number of searches for the search query, and generate the display data for displaying the plurality of web pages or the plurality of evaluation target units in an order according to the evaluation information for a certain segment.

The evaluation support program may cause the computer to further function as an alert generation means configured to generate an alert in a case where the evaluation information satisfies a predetermined condition.

The classification means may classify each search query into any of the plurality of segments based on the one or more words by using a morpheme dictionary or using artificial intelligence.

The classification means may classify each search query into any one of a brand, an area, an economic scale, an opinion/knowledge, and a service as the plurality of segments.

Each search query classified by the classification means may include a common word.

The evaluation support program may cause the computer to further function as an accuracy assignment means configured to classify each of one or more words included in a search query into any of a plurality of segments, and assign an expected accuracy of a conversion rate of the search query according to the segment into which each of the one or more words is classified and a score set for each segment, and the display data generation means may generate display data for displaying the search query and the expected accuracy in association with each other.

According to another aspect of the present invention, there is provided an evaluation support program that causes a computer to function as: an accuracy assignment means configured to classify each of one or more words included in a search query into any of a plurality of segments, and assign an expected accuracy of a conversion rate of the search query according to the segment into which each of the one or more words is classified and a score set for each segment; and a display data generation means configured to generate display data for displaying the search query and the expected accuracy in association with each other.

The accuracy assignment means may assign the expected accuracy according to a total value of the scores set for the segments into which the respective words are classified.

The accuracy assignment means may assign an expected accuracy of a conversion rate of a plurality of search queries including a common word, and the accuracy assignment means does not have to classify the common word, or may also classify the common word, but does not have to include, in the total value, a score of a segment into which the common word is classified.

According to another aspect of the present invention, there is provided an evaluation support device including: a search data acquisition means configured to acquire, from a search engine, search data indicating a relationship between a search query including one or more words, a web page included in a search result for each search query, and a display ranking of the web page; a classification means configured to classify each search query into any of a plurality of segments based on the one or more words; and a display data generation means configured to generate display data for displaying which of the plurality of segments at least a part of the search query is classified into.

According to another aspect of the present invention, there is provided an evaluation support method including: acquiring, by a search data acquisition means from a search engine, search data indicating a relationship between a search query including one or more words, a web page included in a search result for each search query, and a display ranking of the web page; classifying, by a classification means, each search query into any of a plurality of segments based on the one or more words; and generating, by a display data generation means, display data for displaying which of the plurality of segments at least a part of the search query is classified into.

According to another aspect of the present invention, there is provided an evaluation support device including: an accuracy assignment means configured to classify each of one or more words included in a search query into any of a plurality of segments, and assign an expected accuracy of a conversion rate of the search query according to the segment into which each of the one or more words is classified and a score set for each segment; and a display data generation means configured to generate display data for displaying the search query and the expected accuracy in association with each other.

According to another aspect of the present invention, there is provided an evaluation support method including: classifying, by an accuracy assignment means, each of one or more words included in a search query into any of a plurality of segments, and assign an expected accuracy of a conversion rate of the search query according to the segment into which each of the one or more words is classified and a score set for each segment; and generating, by a display data generation means, display data for displaying the search query and the expected accuracy in association with each other.

According to another aspect of the present invention, there is provided an evaluation support program that causes a computer to function as: a search data acquisition means configured to acquire a search query group including a plurality of search queries each including one or more words; a classification means configured to classify each search query into any of a plurality of segments based on the one or more words; and a display data generation means configured to generate display data for displaying how many search queries included in the search query group are classified into which segment for the search query group.

The search data acquisition means may acquire the number of searches for each search query, and the display data generation means may generate display data for displaying a total number of searches for the search query classified into each segment for the search query group.

According to another aspect of the present invention, there is provided an evaluation support program that causes a computer to function as: a search data acquisition means configured to acquire a search query group including a plurality of search queries each including one or more words and the number of searches for each search query; a classification means configured to classify each search query into any of a plurality of segments based on the one or more words; and a display data generation means configured to generate display data for displaying a total number of searches for the search query classified into each segment for the search query group.

According to another aspect of the present invention, there is provided an evaluation support device including: a search data acquisition means configured to acquire a search query group including a plurality of search queries each including one or more words; a classification means configured to classify each search query into any of a plurality of segments based on the one or more words; and a display data generation means configured to generate display data for displaying how many search queries included in the search query group are classified into which segment for the search query group.

According to another aspect of the present invention, there is provided an evaluation support method including: acquiring, by a search data acquisition means, a search query group including a plurality of search queries each including one or more words; classifying, by a classification means, each search query into any of a plurality of segments based on the one or more words; and generating, by a display data generation means, display data for displaying how many search queries included in the search query group are classified into which segment for the search query group.

According to another aspect of the present invention, there is provided an evaluation support device including: a search data acquisition means configured to acquire a search query group including a plurality of search queries each including one or more words and the number of searches for each search query; a classification means configured to classify each search query into any of a plurality of segments based on the one or more words; and a display data generation means configured to generate display data for displaying a total number of searches for the search query classified into each segment for the search query group.

According to another aspect of the present invention, there is provided an evaluation support method including: acquiring, by a search data acquisition means, a search query group including a plurality of search queries each including one or more words and the number of searches for each search query; classifying, by a classification means, each search query into any of a plurality of segments based on the one or more words; and generating, by a display data generation means, display data for displaying a total number of searches for the search query classified into each segment for the search query group.

According to another aspect of the present invention, there is provided an evaluation support program that causes a computer to function as: a search data means configured to acquire a search query including one or more words and a click-through number for each of web pages included in a search result for the search query from each search query; a classification means configured to classify each search query into any of a plurality of segments based on the one or more words; and a display data generation means configured to generate display data for displaying information regarding the click-through number for each segment with respect to the web page.

According to another aspect of the present invention, there is provided an evaluation support program that causes a computer to function as: a search data means configured to acquire a search query including one or more words and a click-through number for each of evaluation target units including a plurality of web pages included in a search result for the search query from each search query; a classification means configured to classify each search query into any of a plurality of segments based on the one or more words; and a display data generation means configured to generate display data for displaying information regarding the click-through number for each segment with respect to the evaluation target unit.

According to another aspect of the present invention, there is provided an evaluation support device including: a search data means configured to acquire a search query including one or more words and a click-through number for each of web pages included in a search result for the search query from each search query; a classification means configured to classify each search query into any of a plurality of segments based on the one or more words; and a display data generation means configured to generate display data for displaying information regarding the click-through number for each segment with respect to the web page.

According to another aspect of the present invention, there is provided an evaluation support device including: a search data means configured to acquire a search query including one or more words and a click-through number for each of evaluation target units including a plurality of web pages included in a search result for the search query from each search query; a classification means configured to classify each search query into any of a plurality of segments based on the one or more words; and a display data generation means configured to generate display data for displaying information regarding the click-through number for each segment with respect to the evaluation target unit.

According to another aspect of the present invention, there is provided an evaluation support method including: acquiring, by a search data means, a search query including one or more words and a click-through number for each of web pages included in a search result for the search query from each search query; classifying, by a classification means, each search query into any of a plurality of segments based on the one or more words; and generating, by a display data generation means, display data for displaying information regarding the click-through number for each segment with respect to the web page.

According to another aspect of the present invention, there is provided an evaluation support method including: acquiring, by a search data means, a search query including one or more words and a click-through number for each of evaluation target units including a plurality of web pages included in a search result for the search query from each search query; classifying, by a classification means, each search query into any of a plurality of segments based on the one or more words; and generating, by a display data generation means, display data for displaying information regarding the click-through number for each segment with respect to the evaluation target unit.

According to another aspect of the present invention, there is provided an evaluation support program that causes a computer to function as: a search data acquisition means configured to acquire a plurality of search queries constituting a search query group and each including one or more words; a classification means configured to classify each search query into any of a plurality of segments based on the one or more words; and a display data generation means configured to generate display data for displaying a classification result.

The display data generation means may generate display data for displaying a proportion of the search queries classified into each of the plurality of segments.

The search data acquisition means may acquire an economic scale of each search query, and the display data generation means may generate display data for displaying a proportion of the search queries classified into each of the plurality of segments in consideration of the economic scale.

The plurality of search queries included in the search query group may include a common word.

According to another aspect of the present invention, there is provided an evaluation support device including: a search data acquisition means configured to acquire a plurality of search queries constituting a search query group and each including one or more words; a classification means configured to classify each search query into any of a plurality of segments based on the one or more words; and a display data generation means configured to generate display data for displaying a classification result.

According to another aspect of the present invention, there is provided an evaluation support method including: acquiring, by a search data acquisition means, a plurality of search queries constituting a search query group and each including one or more words; classifying, by a classification means, each search query into any of a plurality of segments based on the one or more words; and generating, by a display data generation means, display data for displaying a classification result.

BRIEF DESCRIPTION OF DRAWINGS

FIG. 2A is a view schematically illustrating search results for a search query "suit".

FIG. 2B is a view schematically illustrating an example of search data acquired by a search data acquirer 21.

FIG. 2C is a view schematically illustrating another example of the search data acquired by the search data acquirer 21.

FIG. 3 is a view illustrating a classification result obtained by a classifier 23.

FIG. 4 is a view schematically illustrating an example of an initial screen.

FIG. 5A is a view schematically illustrating an example of a search result display screen for each search query.

FIG. 5B is a view schematically illustrating an example of a search result display screen for each search query.

FIG. 6A is a view schematically illustrating an example of a search query classification screen.

FIG. 6B is a view schematically illustrating a state in which a segment to which a sub segment belongs is changed.

FIG. 6C is a view schematically illustrating a state in which a segment to which a sub segment belongs is changed.

FIG. 6D is a view schematically illustrating a state in which a segment to which a sub segment belongs is changed.

FIG. 6E is a view schematically illustrating a screen in which sub segments are grouped into middle categories.

FIG. 6F is a view schematically illustrating a screen including information regarding the number of search queries and the number of searches for each segment for each keyword.

FIG. 7A is a view schematically illustrating an example of a web page evaluation screen.

FIG. 7B is a view schematically illustrating another example of the web page evaluation screen.

FIG. 7C is a view schematically illustrating another example of the web page evaluation screen.

FIG. 8A is a view schematically illustrating an example of a domain evaluation screen.

FIG. 8B is a view schematically illustrating an example of the domain evaluation screen.

FIG. 8C is a view for describing transition from the domain evaluation screen to the web page evaluation screen.

FIG. 9 is a view schematically illustrating another example of the web page evaluation screen.

FIG. 10A is a view schematically illustrating another example of the web page evaluation screen.

FIG. 10B is a view schematically illustrating another example of the web page evaluation screen.

FIG. 11 is a view schematically illustrating another example of the web page evaluation screen.

FIG. 12 is a block diagram illustrating a schematic configuration of an evaluation support system according to a second embodiment.

FIG. 13 is a view illustrating a relationship between a segment and a score.

FIG. 14 is a view illustrating a relationship between the total value of scores and an expected accuracy.

FIG. 15 is a view schematically illustrating a screen that displays a search query classified into each segment for each expected accuracy.

FIG. 16 is a view schematically illustrating a screen example in a case where a search query is classified into a segment and displayed.

FIG. 17 is a view schematically illustrating a screen example in a case where only a segment name and a sub segment name belonging to each segment are displayed.

FIG. 18 is a view schematically illustrating a screen example in a case where search queries assigned with an expected accuracy are displayed side by side for each expected accuracy.

FIG. 19 is a block diagram illustrating a schematic configuration of an evaluation support system according to the second embodiment.

FIG. 20 is a view schematically illustrating an example of search data acquired by a search data acquirer 21.

FIG. 21 is a view illustrating search data together with a classification result obtained by a classifier 22.

FIG. 22 is a view schematically illustrating a counting result obtained by a counter 42.

FIG. 23 is a view schematically illustrating an example of search data acquired by the search data acquirer 21.

FIG. 24 is a view illustrating search data together with a classification result obtained by the classifier 22.

FIG. 25A is a view schematically illustrating a counting result obtained by the counter 42.

FIG. 25B is a view schematically illustrating a counting result obtained by the counter 42.

DESCRIPTION OF EMBODIMENTS

Figure 1:
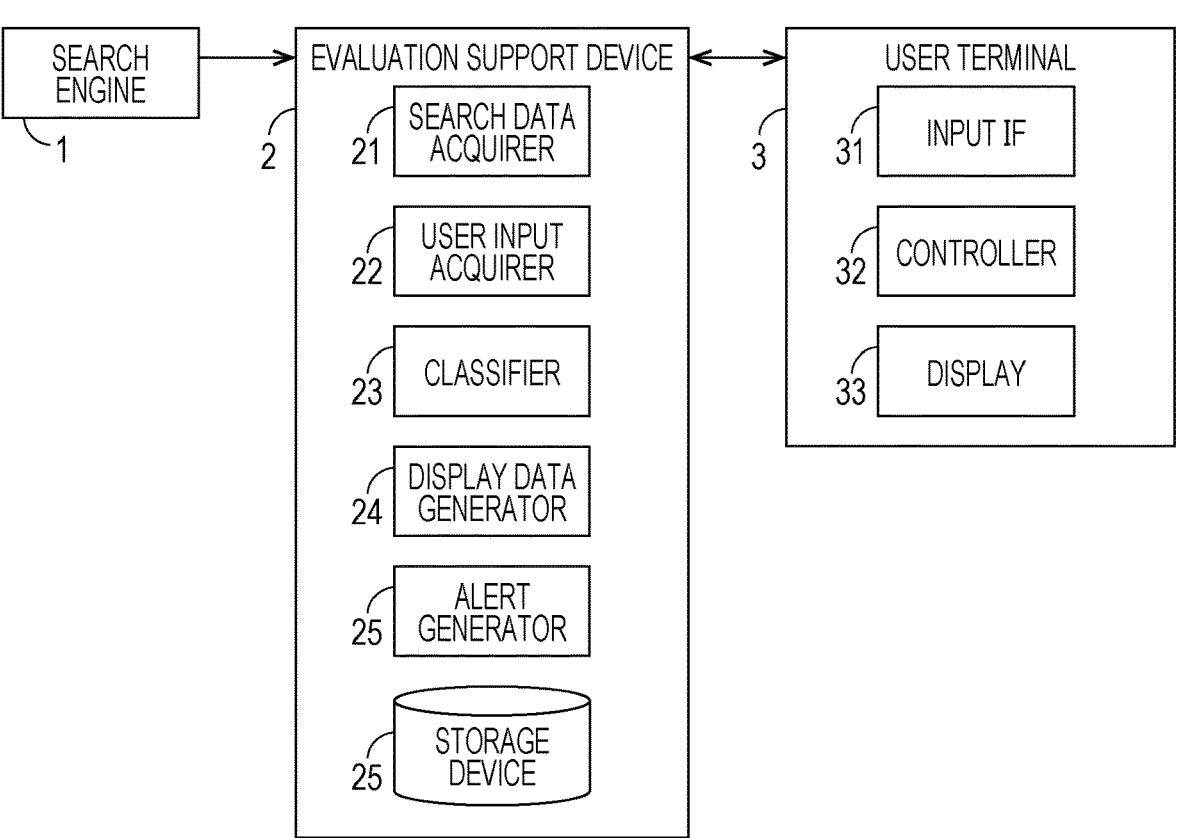
FIG. 1 is a block diagram illustrating a schematic configuration of an evaluation support system according to a first embodiment.

Hereinafter, embodiments according to the present invention will be specifically described with reference to the drawings.

First Embodiment

FIG. 1 is a block diagram illustrating a schematic configuration of an evaluation support system according to a first embodiment. The evaluation support system includes one or more search engines 1, an evaluation support device 2, and a user terminal 3, and the search engines 1, the evaluation support device 2, and the user terminal 3 are communicably connected to one another.

The search engine 1 outputs a search result for an arbitrary search query containing one or more words. The search result contains one or more web pages and a display ranking of each web page. The display ranking is determined by the search engine 1 based on its own criteria in consideration of a search need of a searcher, a content of each web page, and the like. In general, it is known that a content determination result obtained by a natural language analysis technology, a behavior data analysis result for estimating which website has left a favorable impression on the searcher, or the like is used as the criterion. That is, it can be said that a web page displayed at a higher ranking in search results is a web page having a higher probability that the determination results are favorable and the content is accurate and actually preferable for the searcher.

The evaluation support device 2 acquires search data (described later) from the search engine 1. Then, the evaluation support device 2 generates display data for displaying a screen for evaluating a web page on the user terminal 3 based on the search data. A detailed processing operation of the evaluation support device 2 will be described later.

The user terminal 3 is a computer including an input interface 31 (a mouse, a keyboard, a touch panel, or the like), a controller 32, and a display 33. The controller 32 may be a web browser that the user terminal 3 has in advance. Alternatively, some or all of the functions of the controller 32 may be a dedicated application implemented by a processor in the user terminal 3 executing a predetermined program.

The controller 32 transmits a request inputted from a user via the input interface 31 to the evaluation support device 2. Then, the controller 32 receives display data according to the request from the evaluation support device 2, and displays a screen based on the received display data on the display 33.

Among processing operations of the support system, a part of a processing operation described to be performed by the evaluation support device 2 may be performed by the user terminal 3, a part of a processing operation described to be performed by the user terminal 3 may be performed by the evaluation support device 2, or the evaluation support device 2 and the user terminal 3 may perform a processing operation in cooperation.

Next, the evaluation support device 2 will be described in detail. The evaluation support device 2 is a computer including a search data acquirer 21, a user input acquirer 22, a classifier 23, a display data generator 24, and an alert generator 25. Some or all of the functions of these modules may be implemented by a processor in the evaluation support device 2 executing a predetermined program.

The search data acquirer 21 acquires search data from the search engine 1 and stores the search data in a storage device 26 in the evaluation support device 2 (or in an external storage device). The search data acquirer 21 may acquire search data from only one specific search engine 1, but desirably acquires search data from all the main search engines 1.

FIG. 2A is a view schematically illustrating search results for a search query "suit". It is assumed that a certain search engine 1 outputs the following web pages as the first to third display rankings when a search for "suit" is performed (the fourth and subsequent display rankings are omitted).

$1^{st}$ www.a-suits.com/home
$2^{nd}$ www.b-suits.jp
$3^{rd}$ www.a-suits.com/online Here, both "www.a-suits.com/home" of the first ranking and "www.a-suits.com/online" of the third ranking have a common domain of "a-suits.com". As described above, search results for one search query may contain a plurality of web pages having a common domain. The web page here is specified by a URL. Furthermore, the domain corresponds to an IP address, and may be constituted by a plurality of layers such as a top level domain (such as com and jp) and a second level domain.

FIG. 2B is a view schematically illustrating an example of search data acquired by the search data acquirer 21. The search data indicates a relationship between a search query, a web page displayed in a case where a search for the search query is performed by the search engine 1 (that is, a web page contained in a search result), and a display ranking of the web page. In the example of FIG. 2B, the search data indicates that a web page of the first display ranking in search results for a search query "suit" is "www.a-suits.com/home", a web page of the second display ranking is "www.b-suits.jp", and a web page of the third display ranking is "www.a-suits.com/online" (see also FIG. 2A). The same applies to other search queries "set of suit", "double-breasted suit", and the like. Such search data is stored in the storage device 26.

FIG. 2C is a view schematically illustrating another example of the search data acquired by the search data acquirer 21. The search data indicates a relationship between each search query, a domain of a web page displayed in a case where a search for the search query is performed by the search engine 1 (that is, a web page contained in a search result), and a display ranking of the web page. In the example of FIG. 2C, the search data indicates that a domain of a web page of the first display ranking in search results for a search query "suit" is "a-suits.com", a domain of a web page of the second display ranking is "b-suits.jp", and a domain of a web page of the third display ranking is "a-suits.com" (see also FIG. 2A). The same applies to other search queries "set of suit", "double-breasted suit", and the like. Such search data is stored in the storage device 26.

It is desirable that the search data acquirer 21 acquires both the search data in units of web pages illustrated in FIG. 2B and the search data in units of domains illustrated in FIG. 2C. This is because there is a need to perform evaluation in units of web pages (for example, each of "www.a-suits.com/home" and "www.a-suits.com/online" is individually evaluated), and there is a need to perform evaluation in units of domains (for example, whether or not the own site has a necessary web page is evaluated).

Alternatively, the search data acquirer 21 may acquire the search data (FIG. 2B) in units of web pages and count the acquired search data for a predetermined keyword such as "suit", and then create the search data (FIG. 2C) in units of domains.

Further, the search data acquirer 21 also desirably acquires an economic scale and the number of searches per unit period (hereinafter, simply referred to as "the number of searches") for each search query. In a case where the search data is acquired from a plurality of search engines 1, the sums of the economic scales and the numbers of searches from all the search engines 1 are acquired.

The economic scale may be the number of searches itself, or may be obtained by considering at least some of the number of searches, an advertisement rate, competitiveness, and a click rate. As an example, the economic scale may be the product of the number of searches, the advertisement rate, the competitiveness, and the click rate.

The advertisement rate is an advertisement rate regarding an advertisement displayed on a search result screen for the search query, and is a rate arising from display of the advertisement itself or a rate (click unit price) arising every time the displayed advertisement is clicked. The competitiveness is the number of advertisers trying to display advertisements for the search query. The click rate may be a constant value that does not depend on the search query, may be a value assumed for each search query, or may be a value assumed for each industry (for each search query group).

Here, a ranking of a web page to be acquired by the search data acquirer 21 is arbitrary, and all web pages including web pages with lower rankings may be acquired, the search data acquirer 21 may set in advance a lower limit for a ranking of a web page to be acquired, or the user may set a lower limit for a ranking of a web page to be acquired. In addition, there are many search queries, but the search data acquirer 21 acquires an arbitrary search query. The search acquirer may acquire search results for all search queries, may acquire search results for a search query of which the economic scale or the number of searches exceeds a threshold, or may acquire search results for a search query of which the economic scale or the number of searches is a predetermined higher value. The threshold and the predetermined number here may be determined in advance by the search data acquirer 21, or may be settable by the user (the same applies for a "threshold" and "predetermined number" to be described below).

Referring back to FIG. 1, the user input acquirer 22 of the evaluation support device 2 acquires, from the user terminal 3, a user's request regarding what screen is to be displayed on the display 33 of the user terminal 3. A specific example of the screen to be displayed will be described later.

The classifier 23 is one of the present embodiments, and classifies a search query in acquired search data into a plurality of segments (groups) based on words in the search query. The classification is performed mechanically automatically by the classifier 23 basically without a user operation, but may include a user operation that can be performed in a short time (for example, the user performs manual change after segment setting to be described later or automatic classification by the classifier 23).

A method for the classification is not particularly limited, and any known method may be applied. For example, there is a method of using tag information assigned to each word by a publicly available morpheme dictionary. As an example, in a case where the morpheme dictionary assigns a tag "proper noun" to a word representing a company name or a product name, all search queries containing a word to which the "proper noun" tag is assigned may be set to be classified into a "brand" segment. In a case where the morpheme dictionary assigns a tag "place" to a word representing a country name or a station name, all search queries containing a word to which the "place" tag is assigned may be set to be classified into an "area" segment. In addition, a search query containing both a proper noun and a place may be classified into either "brand" or "area" based on predetermined priorities, or may be classified in such a way as to belong to both segments.

As another classification method, artificial intelligence (AI) may be used. In this case, which search query is classified into which segment may be learned in advance.

The plurality of segments may be predetermined segments, may be automatically generated by the classifier 23, or may be set (registered) by the user. There can be five segments, "brand", "area", "economical", "opinion/knowledge", and "service". Here, the "economical" refers to a word group that is likely to be used when searching for economic information such as a price and discount. The "opinion/knowledge" refers to a word group that is likely to be used when searching for a public opinion or generality. The "service" refers to a word group that is likely to be used when searching for service specifications (specifications and functions), a service lineup (course/series), and a service target (trouble, longing, part, and the like). However, the above five segments are merely examples. Some segments may be changed or omitted, or other segments such as "others" and "excluded" described later may be included. The "opinion/knowledge" may be simply referred to as "opinion".

Furthermore, the classifier 23 may classify a search query classified into each segment into a more detailed sub segment (sub group) based on a word in the query.

As a specific example, the classifier 23 can classify search queries containing a common word among a plurality of search queries classified into a specific segment into an identical sub segment. One search query may be classified to belong to a plurality of sub segments. A segment can be considered as a major category, and a sub segment can be considered as a minor category (a middle category will be described later).

As another specific example, the classifier 23 may classify a search query into a sub segment according to the economic scale of each search query. For example, among a plurality of search queries classified into a specific segment, search queries of the top 1 to 10 search scales may be classified into one sub segment, and search queries of the top 11 to 12 search scales may be classified into another sub segment.

FIG. 3 is a view illustrating a classification result obtained by the classifier 23. In this example, a search query is classified into any of the segments "brand", "area", and "service". Then, a search query classified into the segment "area" is further classified into any one of sub segments of "Tokyo", "Osaka", and "Kyoto". For example, search queries classified into "Tokyo" are "Tokyo suit", "suit Tokyo", and "made-to-made-to-order suit Tokyo". The classification result is stored in the storage device 26.

Referring back to FIG. 1, the display data generator 24 of the evaluation support device 2 refers to the search data stored in the storage device 26 and the classification result obtained by the classifier 23, performs appropriate analysis and counting as necessary, and generates display data for displaying a screen according to a request from the user on the display 33 of the user terminal 3. The display data is transmitted to the user terminal 3. The classification result indicates, for example, a segment (moreover, a sub segment) into which each search query is classified. Not all search results are necessarily displayed in practice.

In particular, in the present embodiment, evaluation information according to a search result for a search query classified into each segment can be displayed for each segment for a specific web page or domain (of a web page) based on search data. Furthermore, in a case where the classifier 23 further performs classification into a sub segment, it is possible to display evaluation information according to a search result for a search query classified into each sub segment, for each sub segment for a specific web page or domain (of a website). The evaluation information for the domain can be considered as evaluation information for a web page group having the domain in common, or evaluation information in units of domains.

The alert generator 25 generates an alert in a case where the evaluation information satisfies a predetermined condition. The alert is outputted by an arbitrary device, and may be displayed on the display 33 of the user terminal 33 or reproduced from a speaker (not illustrated) of the display terminal 33, for example.

Next, an example of a screen displayed on the display 33 of the user terminal 3 will be described in detail.

FIG. 4 is a view schematically illustrating an example of an initial screen. For example, when the user designates a predetermined URL via the input interface 31 and requests the evaluation support device 2 to display the initial screen, the display data generator 24 of the evaluation support device 2 refers to and counts the search data, generates display data for displaying the initial screen, and transmits the display data to the user terminal 3. Then, the controller 32 of the user terminal 3 causes the display 33 to display the initial screen according to the display data.

As illustrated in FIG. 4, a plurality of keywords are arranged in a vertical direction on the initial screen, and for each of the keywords, a ranking of the search scale, the number of search queries (sometimes referred to as "the number of long tail keywords"), and the number of searches are displayed in association with each other.

Here, the keyword is a word contained in a plurality of search queries in common. For example, a keyword of three search queries "suit", "set of suit", and "double-breasted suit" is "suit". The keyword may be automatically set by the display data generator 24, may be set (registered) by the user, or may be designated by the search engine 1.

Then, the keywords are arranged in the order of the total value of the economic scale of the search query containing the keyword. The economic scale itself may also be described. The number of search queries is the number of search queries containing the keyword. The larger the number of search queries, the more diversified the need related to the keyword, and the market tends to be mature. The number of searches is the total value of the number of searches for the search queries containing the keyword.

In the initial screen, the user can select one keyword of interest and display a screen that shows a search result for each search query containing the keyword (hereinafter, referred to as a "search result display screen for each search query"). Specifically, the user designates one keyword via the input interface 31, and requests the evaluation support device 2 for display data for displaying the search result display screen for each search query for the keyword.

For example, it is conceivable that a creator of a web page related to "suit" designates "suit" as a keyword and requests for display data for the keyword. In response to the request, the display data generator 24 of the evaluation support device 2 refers to the search data and performs appropriate counting, and generates the display data for displaying the search result display screen for each search query.

FIG. 5A is a view schematically illustrating an example of the search result display screen for each search query, and illustrates a screen that displays a search result for each search query containing "suit" as a keyword in units of web pages based on the search data illustrated in FIG. 2B.

In the search result display screen for each search query, a plurality of search queries "suit", "suit trade-in", "suit Osaka", and the like commonly containing the keyword "suit" are arranged in the vertical direction, and a plurality of web pages "web page A" (for example, "www.a-suits-.com/home" in FIG. 2B), "web page B" (for example, "www.b-suits.jp" in FIG. 2B), and "web page C" (for example, "www.a-suits.com/online" in FIG. 2B) are arranged in a horizontal direction. Then, for each search query, the display ranking of each web page in the search result is displayed.

For example, in the search result for the search query "suit", the display ranking of "web page A" is first, and the display ranking of "web page B" is fifteenth. In the search result for the search query "suit trade-in", the display ranking of "web page A" is second, the display ranking of "web page B" is eighth, and the display ranking of "web page C" is third.

The search queries in the search result display screen for each search query illustrated in FIG. 5A are arranged, for example, in descending order of the number of searches. The number of search queries to be displayed is arbitrary. All search queries may be displayed, only search queries for which the number of searches exceeds a threshold may be displayed, or only search queries for which the number of searches is a predetermined higher value. In addition, the economic scale may be applied instead of the number of searches.

Furthermore, the web pages in this screen are arranged in descending order of a click-through rate (click-through number) for the displayed search query, and the click-through rate (click-through number) may be displayed in association with each web page. The click-through rate and the click-through number are calculated as follows.

A relationship between the display ranking and an assumed click-through rate is set in advance. For example, the click-through rate is set to 25% with respect to the first display ranking. This means that 25% of searchers are assumed to visit the web page whose display ranking is first. Therefore, in FIG. 5A, it is estimated that 77,500 out of 310,000 searchers who have performed a search with the search query "suit" have visited "web page A".

As an example, assuming that the click-through rate of 10% is set for the second display ranking, it is estimated that 7,000 out of 70,000 searchers who have performed a search with the search query "suit trade-in" have visited "web page A". In this manner, a value obtained by summing the click-through numbers estimated for the respective search queries is the click-through number for the web page. Then, a value obtained by dividing the click-through number for the web page by the total number of searches (1,900,000 persons in FIG. 5A) is the click-through rate.

For example, it is estimated that 3.55% (6,745 persons) of 1,900,000 persons who have performed a search using "suit" as a keyword have visited web page A. The number of displayed web pages is arbitrary. All web pages may be displayed, only web pages for which the click-through rate exceeds a threshold may be displayed, or only web pages for which the click-through rate is a predetermined higher value may be displayed.

The order in which the web pages are displayed in FIG. 5A is not limited to the descending order of the click-through rate, and may be, for example, a descending order of a ratio at which each web page is included in the search result for the search query.

In a case where the search query does not fit in one screen, the screen may be scrolled downward to display search queries for which the number of searches is smaller.

FIG. 5B is a view schematically illustrating an example of the search result display screen for each search query, and illustrates a screen that displays a search result for each search query containing "suit" as a keyword in units of domains based on the search data illustrated in FIG. 2C. As an example, switching to the screen of FIG. 5B is made by selecting a "to domain-unit counting screen" button 91 on the screen of FIG. 5A. Switching to the screen of FIG. 5A is made by selecting a "page-unit counting screen" button 92 on the screen of FIG. 5B. Hereinafter, a difference from FIG. 5A will be mainly described.

In the search result display screen for each search query in FIG. 5B, a plurality of search queries "suit", "suit trade-in", "suit Osaka", and the like commonly containing the keyword "suit" are arranged in the vertical direction, and a plurality of web pages "domain D" (for example, "a-suit-s.com" in FIG. 2C), "domain E" (for example, "b-suits.jp" in FIG. 2C), and "domain F" are arranged in the horizontal direction. Then, for each search query, an evaluation value of each domain in the search result is displayed.

The evaluation value is given by the display data generator 24 based on the search data. As a specific example, an evaluation value of a specific domain (for example, "domain D") is determined based on a display ranking of each web page that has the domain and coming up for a target search query. As a more specific example, a ranking of a click-through number for any web page having the domain predicted from the search data can be used as the evaluation value. The evaluation value can also be considered as an ability of the domain to attract visitors as compared with other domains.

The click-through number for the web page may be, for example, a predicted click-through number calculated based on the display ranking in the search result or the like. Alternatively, in a case where the actual click-through number is acquired from the search engine 1, an actual measurement value of the click-through number may be used. The click-through number in the present specification includes both the predicted click-through number and the actually measured click-through number unless otherwise specified. The same applies to the click-through rate.

Here, it is also possible to evaluate a specific web page or a web page having a specific domain based on the search result display screen for each search query illustrated in FIG. 5A or 5B.

For example, in the screen of FIG. 5A or 5B, it is possible to view a web page or a domain with high evaluation (that is, a high display ranking) for each search query while scrolling the screen. However, it is very difficult and time-consuming to check a large number of search queries visually. In addition, there are various search queries, but an evaluator is not necessarily interested in all the search queries.

As another example, it is conceivable to manually classify search queries (for example, grouping similar search queries) and evaluate in what category a specific web page has a high ranking. However, manual classification is very troublesome.

In a case where the evaluation is performed on the display 33, it is necessary to continuously display the screen for a long time, which leads to an increase in power consumption of the user terminal 3.

Therefore, in the present embodiment, the classifier 23 is provided in the evaluation support device 2 to automatically classify search queries. This point will be described below.

In the present embodiment, it is possible to display a screen in which each search query containing an arbitrary keyword is classified into a segment (hereinafter, referred to as a "search query classification screen"). In order to display the search query classification screen, for example, the user designates one keyword of interest from the initial screen of FIG. 4 via the input interface 31, and requests the evaluation support device 2 for display data for displaying the search query classification screen for the keyword.

For example, it is conceivable that a creator of a web page related to "suit" designates "suit" as a keyword and requests for display data for the keyword. In response to this request, the display data generator 24 of the evaluation support device 2 refers to the search data and performs appropriate counting based on the classification result (FIG. 3) obtained by the classifier 23, and generates the display data for displaying the search query classification screen.

FIG. 6A is a view schematically illustrating an example of the search query classification screen, and illustrates the search query classification screen in which search queries containing "suit" as a keyword are classified.

Here, as illustrated in FIG. 3, it is assumed that a plurality of search queries containing "suit" as a keyword are classified into any of a plurality of segments such as "brand", "area", "service" like. Furthermore, it is assumed that a search query classified into the segment "area" is classified into a sub segment such as "Tokyo", "Osaka", or "Kyoto". Search queries that commonly contain a word "Tokyo", such as "Tokyo suit", "suit Tokyo", and "made-to-order suit Tokyo", are classified into the sub segment "Tokyo". The same applies to the other sub segments.

In the search query classification screen, display fields 41 to 43 respectively associated with sub segments "AAA", "BBB", and "CCC" belonging to "brand" are arranged in the vertical direction to constitute a display field group 40 for "brand". The display field groups 40, 50, and 60 for "brand", "area", and "service" are arranged in the horizontal direction. Then, information regarding a search query classified into a sub segment associated with each display field is displayed in the display field. The information regarding the search query is the number of searches, the economic scale, and the like, and the user may be able to change information to be displayed. Furthermore, as information regarding the sub segment, the number of search queries included in the sub segment, the total value of the number of searches, and the like may be contained in the display field, and the user may also be able to change information to be displayed.

For example, search queries such as "Tokyo suit", "suit Tokyo", and "made-to-order suit Tokyo" belonging to the sub segment "Tokyo" obtained by further dividing "area", and the number of searches for each of the search queries are displayed in the display field.

The number of segments to be displayed is arbitrary. All segments may be displayed, only segments for which the total value of the number of search queries belonging to each segment exceeds a threshold may be displayed, or only segments for which the total value is a predetermined higher value may be displayed. In addition, the economic scale may be applied instead of the number of searches. The order in which the segments are displayed may be the descending order of the total value of the number of searches or the descending order of the total value of the economic scale, and the user may set the order in which the segments are displayed to any one of them. It is a matter of course that the order may be the Japanese syllabary order or alphabetical order. The same applies to sub segments to be displayed and search queries to be displayed in each sub segment (that is, in each display field).

In the search query classification screen illustrated in FIG. 6A, a sub segment belonging to a certain segment may be changed to belong to another segment according to a user operation. For example, according to the classification by the classifier 23, the sub segment "Tokyo" belongs to the segment "area". However, in a case where there is a well-known brand such as "Tokyo suit", it is assumed that "Tokyo" should also belong to "brand" according to determination by the user. In this case, as the user performs a predetermined operation, the classifier 23 changes "Tokyo" to also belong to "brand", and stores the change result in the storage device 26. In such a case, the classifier 23 may make "Tokyo" belong to both of "brand" (movement destination segment) and "area" (movement source segment), or may make "Tokyo" belong only to "brand" (movement destination segment). The user may be able to select which to use each time.

As a specific example of the user operation, it is conceivable that a display field associated with "Tokyo" is selected and moved into the display field group "brand" by dragging and dropping via the input interface 31 (see FIGS. 6B and 6C). Display of such movement may be controlled by the display data generator 24 of the evaluation support device 2 or may be controlled by the controller 32 of the user terminal 3.

As another example of the user operation, when "Tokyo" is selected via the input interface 31, the controller 32 displays a segment change field as illustrated in FIG. 6D. In the segment field, a segment other than "area" to which "Tokyo" currently belongs is displayed as a movement destination candidate. Then, the user may select the segment to be the movement destination with a radio button or the like.

As the segment, there may be "others" that do not belong to any other segment, or "excluded" for grouping meaningless sub segments or sub segments of no interest.

In addition, hierarchization of sub segments may be made by the user manually grouping one or more sub segments (minor category) which is a result of automatic classification by the classifier 23 to form a middle category. For example, in FIG. 6A, among the sub segments belonging to "area", sub segments of the Kanto area (an area close to Tokyo) may be collectively classified into one middle category, sub segments in the Kansai area (an area close to Osaka) may be collectively classified into one middle category, and the screen as illustrated in FIG. 6E may be displayed. With such a screen, it is possible to simultaneously grasp the results of the major category (segment) and the middle category in one screen.

An example of a specific procedure for forming the middle category is as follows. First, the user selects one or more sub segments (for example, "Osaka" and "Kyoto") that the user wants to group as one middle category. Next, the classifier 23 displays a screen for receiving the name of the middle category. Then, the classifier 23 receives an input of an arbitrary name (for example, "Kansai") from the user via the input interface 31. As described above, the classifier 23 can form a middle category for a plurality of sub segments.

With the above configuration, the classifier 23 can automatically classify search queries into segments as major categories, automatically classify search queries classified into each segment into sub segments as minor categories, and further group one or more sub segments as a middle category based on the user operation. Then, the screens of FIGS. 6A to 6E or the like facilitate evaluation of a search query.

In addition, the display data generator 24 may generate display data for displaying the screen illustrated in FIG. 6F based on the information illustrated in FIGS. 4 and 6A. The field of "total" in FIG. 6F is the same as that in FIG. 4. In addition, the screen of FIG. 6F contains information regarding the number of search queries and the number of searches for each segment for each keyword.

For example, there are 2,100 search queries with "suit" as a keyword, and 400 of them are included in the segment "brand", and a proportion thereof is 19.05% (=400/2100). Furthermore, the number of searches for a search query group with "suit" as a keyword is 1,900,000/month, and 800,000 of them are for search queries included in the segment "brand" (in other words, the total number of searches for the search queries classified into the segment "brand" is 800,000), and a proportion thereof is 42.11% (=800,000/1,900,000).

In this manner, for each search query group, it is indicated how many search queries contained in the search query group is classified into which segment. In addition, for each search query group, the total number of searches for the search query classified into each segment is indicated. Only one of the number of search queries and the total number of searches may be displayed.

With such display, a segment proportion can be grasped for each search query group, and it becomes easy to extract a search query group in which a specific segment has a high proportion. For example, in the example of FIG. 6F, a proportion of the segment "economical" is high in a search query group having "shirt" as the search query. Therefore, in a case of creating a portal site for "shirt", it is effective to enrich web pages related to "economical". On the other hand, a proportion of the segment "brand" is high in a search query group having "men's" as the search query. Therefore, in a case of creating a portal site for "men's", it is effective to enrich web pages related to "brand". This can be quickly grasped from the screen of FIG. 6F.

In order to display the search query classification screen, it is not always necessary to pass through the initial screen and the like of FIG. 4. For example, a search window 93 may be prepared in FIG. 6A, and an arbitrary keyword may be inputted to the search window 93 so that a search query classification screen for the keyword can be displayed.

In the search query classification screen illustrated in FIG. 6A, it is possible to further display a screen (hereinafter, referred to as a "web page evaluation screen") containing a display ranking of a specific web page (hereinafter, also referred to as a "target web page"). Specifically, the user designates the target web page via the input interface 31, and requests the evaluation support device 2 for display data for displaying a web page evaluation screen for the web page.

For example, it is conceivable that a web page creator designates a web page created by himself/herself as the target web page or designates a competing web page as the target web page. In the designation, an arbitrary web page may be registered in advance, or a URL may be designated each time. Once the target web page is designated, the display data generator 24 of the evaluation support device 2 refers to the search data and performs appropriate counting based on the classification result obtained by the classifier 23, and generates the display data for displaying the search query classification screen.

The search query classification screen may be displayed by selecting the target web page from the search result display screen illustrated in FIG. 5A.

FIG. 7A is a view schematically illustrating an example of the web page evaluation screen. FIG. 7A illustrates an example in which "www.a-suits.com/online" is designated as the target web page. A web page name "suit shop" and a URL "www.a-suits.com/online" are added to an upper portion of the search query classification screen of FIG. 6. Further, the display ranking of the target web page is added as the evaluation information in association with the search query in the display field of FIG. 6. That is, the display ranking of the target web page included in the search result for the search query classified into each segment (and each sub segment) is displayed as the information according to the search result. "-" means that the display ranking is too low or the target web page does not come up for the search result.

For example, it is displayed in the sub segment "Kyoto" obtained by further dividing "area" that a display ranking of a target website for the search query "Kyoto suit" belonging to the sub segment "Kyoto" is first. This indicates that when a search for the search query "Kyoto suit" is performed, "www.a-suits.com/online" is outputted as the first display ranking. The same applies to other search queries.

For example, referring to FIG. 7A, the display ranking of the target web page is relatively high for each search query belonging to the segment "area". Therefore, it can be said that the target web page is a rich page regarding "area".

On the other hand, for some search queries belonging to the segment "brand", the target web page generally has a low display ranking and some does not come up. Therefore, there is a possibility that the target web page is not a very rich page regarding "brand". Therefore, referring to FIG. 7A, it can be seen that the target web page should have more contents regarding "brand".

Furthermore, for the segment "service", the display ranking of the target web page is relatively high for each search query belonging to the sub segment "men's". On the other hand, the display ranking of the target web page is relatively low for each search query belonging to the sub segment "ladies'". Therefore, referring to FIG. 7A, it can be seen that the web page should have more contents regarding "ladies'".

In this way, since a search result for a search query is displayed for each segment (for each sub segment) after classifying the search query, the user can evaluate the target web page in a short time.

FIG. 7B is a view schematically illustrating another example of the web page evaluation screen. In FIG. 7B, two web pages "www.a-suits.com/online" (abbreviated as "W1") and "www.b-suits.jp" (abbreviated as "W2") are designated. Then, the display ranking of each of the web pages is displayed in the display field. In a case where two display rankings are arranged, the two display rankings can be easily compared, which is preferable. It is a matter of course that the number of designated web pages is not limited to two, and may be three or more.

As an example, a web page creator can designate a plurality of web pages created by himself/herself and use the web pages to evaluate whether or not intended search results are obtained. As another example, a web page creator can designate a web page created by himself/herself and a competing web page, and use the web pages to evaluate superiority and inferiority of the web pages.

As described above, it is difficult to evaluate a web page in a short time on a screen in which display rankings of web pages for search queries are listed as illustrated in FIG. 5A. On the other hand, in the present embodiment, as illustrated in FIGS. 7A and 7B, a search query is classified into a segment (and a sub segment), and a display ranking of a target web page for the search query is displayed for each segment (and each sub segment). Therefore, it is possible to evaluate in which category the target web page has/does not have a high display ranking in a short time.

FIG. 7C is a view schematically illustrating another example of the web page evaluation screen. In FIG. 7C, only search queries having the first display ranking in the screen of FIG. 7A are displayed. As an example, when the user performs a predetermined operation in a state where the screen of FIG. 7A is displayed, the display data generator 24 refers to the storage device 26, acquires search queries for which the display ranking of the target web page is first, and a segment and a sub segment to which the search queries belong from the storage device 26, and generates display data for displaying the screen of FIG. 7C.

In addition, only search queries having the display ranking equal to or higher than a predetermined rank may be displayed or only search queries having the display ranking equal to or lower than a predetermined rank may be displayed according to the user operation.

In FIGS. 7A to 7C, the information regarding the search result is displayed in units of web pages, but the information regarding the search result may be displayed in units of domains. That is, in the search query classification screen illustrated in FIG. 6A, it is possible to further display a screen (hereinafter, referred to as a "domain evaluation screen") containing a display ranking of a specific domain. Specifically, the user designates a specific domain via the input interface 31, and requests the evaluation support device 2 for display data for displaying the domain evaluation screen for the domain.

FIG. 8A is a view schematically illustrating an example of the domain evaluation screen. As a difference from FIG. 7A, in each display field, an evaluation value of a designated domain is displayed as evaluation information in association with a search query. The evaluation value is as described above.

For example, for each search query belonging to the segment "area", the evaluation value of the designated web page is relatively high. Therefore, it can be seen that the target domain "a-suits.com" has a sufficient web page related to "area" (at least the search engine 1 evaluates as such).

On the other hand, for some search queries belonging to the segment "brand", the target web page generally has a low evaluation value and some does not come up. Therefore, there is a possibility that the target domain is not a very rich page for "brand", or such a page does not exist in the first place (at least the search engine 1 evaluates as such). Therefore, referring to FIG. 8A, it can be seen that the web page should have more contents regarding "brand".

The above can be seen at a glance in units of segments or sub segments.

There are usually a large number of web pages in one domain. Therefore, it is desirable to easily know which web page actually comes up for the search query. As an example, when a search query (alternatively, the number of searches or evaluation value thereof) in FIG. 8A is selected, it is desirable to display information (for example, a URL and a display ranking thereof) for specifying a web page which comes up as illustrated in FIG. 8B.

FIG. 8B is a display example in a case where the search query "Tokyo suit" (alternatively, the number of searchers of "16,000" that is information of the search query or the evaluation value of "1$^{st}$") of FIG. 8A is selected, and it can be seen that two web pages "a-suits.com/tokyo" and "a-suits.com/tokyo-suits" subordinate to a web site "a-suits.com" come up for the search. Furthermore, by comparing the display rankings of these two web pages for the search (alternatively, the click-through numbers resulting from the display rankings) with that of a competing site, it can be seen that a comprehensive evaluation of the web site "a-suits.com" for the search query "Tokyo suit" is "1st". In order to simplify the display of the web page, the domain "a-suits.com" may be omitted, and the web page may be simply displayed as "/tokyo" or "/tokyo-suits". Furthermore, for each of the two web pages, the display ranking ("2$^{nd}$" or "3$^{rd}$" in FIG. 8B) and the click-through number ("3,000" or "2,000" in FIG. 8B) (when a search is performed with the search query "Tokyo suit") may be displayed.

Also in a case of displaying in units of domains, as in FIG. 7B, two domains may be designated, and an evaluation value for each domain may be displayed in the display field. In addition, a screen similar to that in FIG. 7C may be displayed.

Furthermore, in the domain evaluation screen of FIG. 8A, for example, subordinate web pages may be selectable by selecting a portion where the domain is displayed (see FIG. 8C). When any one of the web pages is selected, transition to the web page evaluation screen (FIG. 7A) for the web page as a target web page is made.

In addition, various types of information may be additionally displayed in each display field. For example, as illustrated in FIG. 9, the click-through number and the click-through rate may be displayed in each display field of the web page evaluation screen illustrated in FIG. 7A. The click-through rate and the click-through number are desirably displayed for each search query and for the entire sub segment. However, only one of the click-through number and the click-through rate may be displayed.

The click-through number (click-through rate) for each search query is (a proportion of) the total number of persons who are considered to have actually accessed the target web page from the search result screen among the total number of persons who have performed a search with the search query. The click-through number (click-through rate) for the entire sub segment is (a proportion of) the total number of persons who have actually accessed the target web page among the total number of persons who have performed a search with any search query belonging to the sub segment.

Although FIG. 9 illustrates the click-through number and the click-through rate displayed in the display field of the web page evaluation screen, the click-through number and the click-through rate may also be displayed in each display field of the domain evaluation screen (FIG. 8A). In this case, the click-through number (click-through rate) for each search query is (a proportion of) the total number of persons who have actually accessed any web page having the target domain among the total number of persons who have performed a search with the search query. The click-through number (click-through rate) for the entire sub segment is (a proportion of) the total number of persons who have actually accessed any web page having the target domain among the total number of persons who have performed a search with any search query belonging to the sub segment.

The click-through number and the click-through rate are indices that are generally regarded as results of attracting visitors to the web page. Therefore, by performing the display as illustrated in FIG. 7A, it is not necessary to check the display ranking of each page, the click-through rate, and the click-through rate for each search query in the sub segment one by one, and it is possible to quickly grasp a result of attracting visitors of the target website for each sub segment only by checking the click-through number and the click-through rate for the entire sub segment.

Furthermore, the display data generator 24 may display the evaluation information for each segment with respect to the target web page. The evaluation information may be, for example, an evaluation value based on a search result for a search query classified into each segment and the number of searches for the search query. More specifically, the evaluation value may be the click-through number from a search query classified into each segment based on a search result for the search query classified into the segment and the number of searches for the search query. Such an evaluation value may be calculated by the display data generator 24 or may be acquired from the outside (for example, the search engine 1). Hereinafter, a specific example will be described with reference to FIG. 7A.

First, it is assumed that a display ranking of a certain web page in a search result and a click-through rate which is a rate of visiting the web page are known. Hereinafter, in order to simplify the description, it is assumed that 25% of searchers visit in a case of the first display ranking, 10% of the searchers visit in a case of the second display ranking, 5% of the searchers visit in a case of the third display ranking, and no searcher visit in a case of the fourth or lower display rankings.

As illustrated in FIG. 7A, search queries classified into the segment "area" are nine of "Tokyo suit", "suit Tokyo", "made-to-order suit Tokyo", "Osaka made-to-order suit", "Osaka suit", "suit Osaka", "Kyoto suit", "Kyoto suit inexpensive", and "suit Kyoto". The total number of searchers for these nine search queries is 23,000+10,000+28,000=61,000.

Among them, since the display ranking of the target web page for "Tokyo suit" is first, the click-through number from "Tokyo suit" for the target web page is estimated to be 16,000*0.25=4,000. Furthermore, since the display ranking of the target web page for "Osaka suit" is second, the click-through number from "Osaka made-to-order suit" for the target web page is estimated to be 2,000*0.10=200. Similarly, the click-through number from "Kyoto suit" for the target web page is estimated as 9,000*0.25=2,250. Since the display ranking of the target web page for other search queries is equal to or lower than fourth, no one visits the target web page from the other search queries.

From the above, the total click-through number from all the search queries classified into the segment "area" for the target web page is 4,000+200+2,250=6,450. This is about 11% of the total number of searchers (=6,450/61,000). 6,450 and about 11% are evaluation values of the target web page for the segment "area".

Similarly, considering the segment "brand", since the display ranking for all the search queries is fourth or lower, the evaluation value for the segment "brand" is 0. Further, considering "service", the click-through number from "suit men's" is 2,700, the click-through number from "men's suit" is 450, and the click-through number from all the search queries classified into "service" is 3,150.

Therefore, the display data generator 24 may generate display data for displaying the screen illustrated in FIG. 10A. In this screen, the evaluation value (click-through number) is displayed in association with each segment. In addition, the total number of searchers for a search query classified into each segment may be displayed. In addition, as illustrated in FIG. 10B, the display data generator 24 may display segments in the order according to the evaluation information, more specifically, in the order according to the click-through number.

In the screen of FIG. 10A or FIG. 10B, it is obvious at a glance that the segment "area" has been able to attract visitors (specifically, among 61,000 searchers, 6,450 persons have visited), but the segment "brand" has not been able to attract visitors.

In addition, the display data generator 42 may acquire the click-through number for each segment as the evaluation information for a plurality of web pages. Then, in a case where a segment is designated by the user via the input interface 31, websites may be displayed side by side in an order according to the click-through number from the segment (for example, in descending order) (see FIG. 11). As a result, it is possible to grasp a web page with a large click-through number for a specific segment.

The above processing may be performed not in units of web pages but in units of domains. In addition, instead of estimating the click-through number from the display ranking, an actual measurement value of the click-through number may be acquired from the search engine 1 or the like.

As described above, it is difficult to evaluate a web page having the domain in a short time on a screen in which the evaluation values of the domains for the search queries are listed as illustrated in FIG. 5B. On the other hand, in the present embodiment, as illustrated in FIG. 8, a search query is classified into a segment (and a sub segment), and evaluation information (evaluation value) of a target domain for the search query is displayed for each segment (and each sub segment). Therefore, it is possible to evaluate in which category the target domain has/does not have a preferred web page in a short time.

Then, the alert generator 25 may generate an alert according to a result of comparison between an evaluation value and a predetermined threshold. For example, the alert generator 25 may generate an alert in a case where an evaluation value, which is a main index such as the click-through number, the click-through rate, and a search ranking for the target web page (alternatively, the target domain, the same being applied below), exceeds or does not reach a target value or a threshold.

As a result, a time for displaying the evaluation screen on the display 33 can be shortened, and power consumption of the user terminal 3 can be reduced.

In FIG. 1, in addition to the controller 32, at least some of the search data acquirer 21, the user input acquirer 22, the classifier 23, and the display data generator 24 may be provided in the user terminal 3. That is, at least some of these modules may be implemented by a processor of the user terminal 3 executing a predetermined program.

In addition, although various screen examples have been illustrated, it is not essential to display all the screens, and it is needless to say that some screens may be omitted as appropriate. For example, the user operation illustrated in FIGS. 6B to 6E in which a target web page or the like is not designated may be possible in each of FIGS. 7A to 10B in which a target web page or target domain is designated.

In addition, the flow of the screen examples in FIG. 4 and subsequent drawings is merely an example. For example, although FIG. 4 illustrates an example in which keywords are arranged and a plurality of search queries containing a common keyword are classified into a segment by selecting one keyword, processing such as classification into segments may be performed on a plurality of arbitrary search queries.

Second Embodiment

A second embodiment described below automatically assigns, to a search query, an expected accuracy corresponding to a conversion rate of the search query. The conversion rate is a rate at which a searcher who has visited a web page makes a purchase, makes an inquiry through an inquiry page, or transitions to another important web page. This rate tends to be higher mainly when a content of the web page meets search needs of the visiting searcher. Therefore, it is important to constitute the web page with contents for which search query. From such a background, in a web page planning stage, there is a practical need to easily find a search query with higher expectation accuracy among a large number of search queries.

FIG. 12 is a block diagram illustrating a schematic configuration of an evaluation support system according to the second embodiment. Hereinafter, differences from the first embodiment will be mainly described.

An evaluation support device 2 in the evaluation support system includes an expected accuracy assigner 41. The expected accuracy assigner 41 assigns an expected accuracy of a search query as follows.

First, the expected accuracy assigner 41 decomposes a search query into words (morphemes). For example, in a case where the search query is "suit Kyoto inexpensive", the expected accuracy assigner 41 decomposes the search query into "suit", "Kyoto", and "inexpensive".

Next, the expected accuracy assigner 41 classifies each word into any of a plurality of predetermined segments. A method for the classification is not particularly limited, and any known method such as using a morpheme dictionary may be applied. For example, the expected accuracy assigner 41 classifies "suit", "Kyoto", and "inexpensive" into segments of "service", "area", and "economical", respectively.

Then, the expected accuracy assigner 41 adds scores set for the segments into which the words are classified. For example, as illustrated in FIG. 13, a score (point) is associated with each segment. For the search query "suit Kyoto inexpensive", a score of "suit" classified into "Service" is one point, a score of "Kyoto" classified into "Area" is three points, a score of "inexpensive" classified into "economical" is five points, and the total value is nine points.

In a case where a plurality of words are classified into one segment, addition may be redundantly performed, or addition may be performed only once. For example, the total value for the search query "suit sales inexpensive" constituted by "suit" belonging to "service" (score: one point) and "sales" and "inexpensive" both belonging to "economical" (score: five points) may be 11 points obtained by redundantly adding "sales" and "inexpensive", or may be six points obtained by combining "sales" and "inexpensive".

Here, a relationship between the segment and the score may be arbitrary. As an example, a higher score may be set in advance for a segment having a higher conversion rate. More specifically, in a case where a search query belonging to "brand" or "economical" tends to be easily connected to purchase, a high score can be set for "brand" and "economical" in advance. The score may be set manually. Alternatively, in a case where the search engine 1, an access analysis tool, or the like grasps a search query that is likely to lead to visiting or conversion, the expected accuracy assigner 41 may automatically set the score by acquiring necessary information from the search engine 1, the access analysis tool, or the like.

Alternatively, the same score may be set for each segment more simply. Even in this case, an expected accuracy reflecting a tendency that a higher conversion rate can be obtained for a search query belonging to a plurality of segments can be obtained.

In addition, since a word or search query that is not classified into any segment is considered to have a low conversion rate, the score may be set to 0.

Next, the expected accuracy assigner 41 assigns the expected accuracy of the conversion rate according to the total value. For example, as illustrated in FIG. 14, the relationship between the total value and the expected accuracy is determined in advance as a threshold table. As described above, the total value of the scores for the search query "suit Kyoto inexpensive" is nine points, and according to FIG. 14, the expectation accuracy of 4 is assigned.

The display data generator 24 generates display data for displaying the obtained expected accuracy in association with the search query. The relationship between the segment and the score illustrated in FIG. 13 and the relationship between the total value and the expected accuracy illustrated in FIG. 14 may be stored in a storage device 26. In a case where the expected accuracy is set to five levels as illustrated in FIG. 14, for example, the expected accuracy of 5 is a conversion rate of 2 to 3%, the expected accuracy of 4 is a conversion rate of less than 1 to 2%, the expected accuracy of 3 is a conversion rate of less than 0.5 to 1%, the expected accuracy of 2 is a conversion rate of less than 0.1 to 0.5%, and the expected accuracy of 1 is a conversion rate of less than 0.1. In this way, by setting the expected accuracy for a predetermined range of the conversion rate, a large number of search queries can be easily classified for each expected accuracy. In addition, the expected accuracy of 0 corresponding to a conversion rate of 0 may be set, so that a search query for which conversion is not expected at all can be classified.

In a case where a plurality of search queries (see FIG. 5A) containing a common keyword are compared with each other with an expected accuracy assigned, the keyword does not have to be considered in assigning the expected accuracy. Specifically, the expected accuracy assigner 41 does not have to classify the keyword into a segment. Alternatively, the expected accuracy assigner 41 does not have to include, in the total value, a score of a segment into which the keyword is classified. For example, the search query "suit Kyoto inexpensive" is classified into "suit", "Kyoto", and "inexpensive", but only three points corresponding to the score of "Kyoto" classified into "area" and five points corresponding to the score classified into "economical" may be added (one point of "suit" classified into "service" is not added). This is because the keyword is contained in a plurality of search queries in common, and thus, it is not necessary to consider the keyword when relatively comparing the plurality of search queries. By assigning the expected accuracy without considering the keyword, a processing amount of the expected accuracy assigner 41 can be reduced.

As described above, in the present embodiment, the expected accuracy of the search query can be automatically assigned. As a result, it becomes easy to perform discrimination between a search query for which conversion can be expected and a search query for which conversion is not expected.

The expected accuracy assigner 41 described in the second embodiment may be combined with the first embodiment. In this case, a search query classified into each segment by the classifier 23 can also be displayed for each expected accuracy. For example, as illustrated in FIG. 15, a brand and an accuracy of a search query may be displayed in a matrix form.

In FIG. 6A and the like, a search query is classified into a segment, further classified into a sub segment, and displayed. However, as illustrated in FIG. 16, a search query may be classified into a segment without being classified into a sub segment, and displayed. That is, the display data generator 24 may generate display data for displaying each search query in association with a segment. Furthermore, as described with reference to FIGS. 6B to 6D and the like, after a sub segment belonging to a certain segment is changed to belong to another segment by a user operation, the display as illustrated in FIG. 16 may be performed based on the changed segment. Furthermore, in the screen of FIG. 16, a search query belonging to a certain segment may be changed to belong to another segment.

An order in which search queries are displayed in FIG. 16 may be, for example, a descending order of the number of searches or a descending order of the expected accuracy described in the second embodiment. In particular, in a case of a keyword (market) with a small number of search queries, it may be preferable to perform display in units of segments.

In addition, the search queries in the display of FIGS. 6A and 7A may be omitted, and only a segment name and a sub segment name belonging to each segment may be displayed (FIG. 17). That is, the display data generator 24 may generate display data for displaying the sub segment name in association with the segment. With such display, sub segments (morphemes) belonging to each segment can be overviewed.

Furthermore, as illustrated in FIG. 18, search queries assigned with an expected accuracy may be displayed side by side for each expected accuracy. That is, the display data generator 24 may generate display data for displaying each of the search queries in association with the expected accuracy.

Third Embodiment

In the second embodiment to be described next, a tendency of visiting each web page or website from a segment is estimated.

FIG. 19 is a block diagram illustrating a schematic configuration of an evaluation support system according to the third embodiment. Hereinafter, differences from the first embodiment will be mainly described. An evaluation support device 2 includes a counter 41 that performs processing to be described later.

A search data acquirer 21 according to the present embodiment acquires, as search data, a search query, a web page contained in a search result for each search query, and a click-through number for each web page from a search engine 1.

FIG. 20 is a view schematically illustrating an example of search data acquired by the search data acquirer 21, and corresponds to FIG. 2B. In the illustrated example, the first display ranking in a search results for a search query "suit AAA" is a web page W1, the second rank is a web page W2, the third rank is a web page W4, and the number of searches is 200,000. Hereinafter, in order to simplify the description, it is assumed that there are only five search queries illustrated in FIG. 20.

In FIG. 19, a classifier 22 classifies each search query into any of a plurality of segments as described above.

FIG. 21 illustrates the search data together with a classification result obtained by the classifier 22. As illustrated, search queries "suit AAA" and "BBB suit" are classified into a segment "brand", search queries "Tokyo suit" and "suit Osaka" are classified into a segment "area", and a search query "double-breasted suit" is classified into a segment "service" by the classifier 22.

In FIG. 19, the counter 42 counts the number of searches for each segment with respect to at least one web page. Here, it is assumed that a relationship between a display ranking in a search result and a click-through number of searchers is assumed in advance. As a specific example, it is assumed that 25% of searchers visit a web page of the first display ranking, 10% of searchers visit a web page of the second display ranking, and 5% of searchers visit a web page of the third display ranking.

FIG. 22 is a view schematically illustrating a counting result obtained by the counter 42. For example, in FIG. 21, the display ranking of the web page W1 is first in the search result for the search query "suit AAA" classified into the segment "brand". Therefore, it is estimated that 50,000 persons, which is 25% of the number of searches of 200,000 for the search query "suit AAA", have visited the web page W1. Similarly, it is estimated that 7,500 persons, which is 25% of the number of searches of 30,000 for the search query "BBB suit", have visited the web page W1. Therefore, it is estimated that a total of 57,500 persons have visited the web page W1 from the segment "brand".

On the other hand, the display ranking of the web page W1 is third in the search result for the search query "suit Osaka" classified into the segment "area". Therefore, it is estimated that 4,000 persons, which is 5% of the number of searches of 80,000 for the search query "suit Osaka", have visited the web page W1. Therefore, it is estimated that a total of 4,000 persons have visited the web page W1 from the segment "area".

Furthermore, the display ranking of the web page W1 is second in the search result for the search query "double-breasted suit" classified into the segment "service". Therefore, it is estimated that 5,000 persons, which is 10% of the number of searches of 50,000 for the search query "double-breasted suit", have visited the web page W1. Therefore, it is estimated that a total of 5,000 persons have visited the web page W1 from the segment "service".

Similarly, the click-through number for each segment with respect to the web page W2 is estimated. In a case where an actual value of the click-through number for each web page can be acquired from the search engine 1, the counter 42 may calculate the click-through number for each segment with respect to each web page by using the actual value.

For the web page W1, visit from the segment "brand" is 86%, visit from the segment "area" is 6%, and visit from the segment "service" is 8%. According to this result, it can be seen that a large number of searchers have visited the web page W1 from "brand". On the other hand, it can be seen that a large number of searchers have visited the web page W2 from "area".

A display data generator 24 in FIG. 19 generates display data for displaying information regarding the click-through number for each segment with respect to each web page. As a specific example, how many searchers have visited a web page from which segment may be displayed (for some or all segments), or a segment having the highest click-through number for a web page may be displayed.

In this way, by counting the click-through number for each segment with respect to a web page, it is possible to know the type of visit to each web page and to use the information for tagging each web page.

The counting may be performed for each web page, and the counting may be performed in units of web sites including web pages having a common domain. This makes it possible to know the type of visit to a web site.

Fourth Embodiment

A fourth embodiment described below visualizes features of a search query group containing a plurality of search queries by dividing the search queries into segments. Since a schematic configuration of an evaluation support system according to the present embodiment is similar to that illustrated in FIG. 19, an overlapping description will be omitted.

In the evaluation support system illustrated in FIG. 19, a search data acquirer 21 of the present embodiment acquires a plurality of search queries from a search engine 1 in units of search query groups. In the present embodiment, a search query group is constituted by a plurality of search queries containing a common keyword, but the user may also group arbitrary search queries as a search query group.

FIG. 23 is a view schematically illustrating an example of search data acquired by the search data acquirer 21. In this example, it is assumed that five search queries of "job change Tokyo", "job change Osaka", "job change hometown", "job change A company", and "job change site" are acquired for a search query group containing "job change" as a keyword. The same applies to a search query group containing "job offer" as a keyword. In addition, a search data acquirer 1 may acquire an economic scale (the number of searches per month in this example) of each search query. The number of search query groups acquired by the search data acquirer 21 is not particularly limited.

In the evaluation support system of FIG. 19, a classifier 23 classifies each search query into any of a plurality of segments as described above. FIG. 24 illustrates search data together with a classification result obtained by the classifier 23.

The counter 41 of FIG. 19 counts search queries contained in each search query group in units of segments.

FIG. 25A illustrates an example in which counting is performed based on the number of search queries. In the search query group "job change" of FIG. 24, the number of search queries classified into "brand" is one, the number of search queries classified into "area" is three, and the number of search queries classified into "service" is one. Therefore, a proportion of the search queries included in each segment is 20% for "brand", 60% for "area", and 20% for "service".

Similarly, for the search query group "job offer", a proportion of the search queries included in each segment is 86% for "brand", 14% for "area", and 0% for "service". It can be said that FIG. 25A illustrates the proportion calculated for each segment based on the number of search queries.

FIG. 25B illustrates an example in which not only the number of search queries but also the number of searches are counted. In the search query group "job change" in FIG. 24, a search query classified into "brand" is only "job change A company", and the number of searches is 600. Search queries classified into "area" are "job change Tokyo" (the number of searches: 2,000), "job change Osaka" (the number of searches: 1,500), and "job change hometown" (the number of searches: 800), and the total number of searches is 4,300 (=2,000+1,500+800). A search query classified into "service" is only "job change site", and the number of searches is 100.

Therefore, considering the number of searches, the proportion of search queries included in each segment is 12% (=600/(600+4,300+100)) for "brand", 86% (=4,300/(600+4,300+100)) for "area", and 2% (=100/(600+4,300+100)) for "service". It can be said that FIG. 25B illustrates the proportion calculated for each segment based on the number of searches.

Similarly, for the search query group "job offer", a proportion of the search queries included in each segment in consideration of the number of searches is 86% for "brand", 14% for "area", and 0% for "service".

The display data generator 24 in FIG. 19 generates display data for displaying a classification result obtained by the classifier 23 on a display 33 of a user terminal. As a specific example, the proportion of the search queries classified into each segment may be displayed as illustrated in FIG. 25A, or the proportion of the search queries may be displayed in consideration of the search scale such as the number of searches as illustrated in FIG. 25B.

Although "job change" and "job offer" are search query groups that seem to have similar search needs at a glance, according to FIGS. 25A and 25B, the search query group "job change" containing a larger number of search queries related to "area", and the search query group "job offer" containing a larger number of search queries related to "brand". From this, it can be seen that it is only required to enrich a content group related to "area" in a case of constructing a site related to "job change", and it is only required to enrich a content related to "brand" in a case of constructing a site related to "job offer".

As described above, according to the fourth embodiment, by calculating and displaying a proportion of each segment for each search query group, it is possible to intuitively know a tendency of search needs for each search query group. In addition, this makes it possible to obtain a clue for determining what kind of web page or content needs to be enriched more in a case of constructing a web site for the search query groups. In addition, when planning priority setting and budget allocation at the time of producing them, it is easy to perform intensive allocation to a segment and a search need for which more an actual search demand is expected.

In each of the above-described embodiments, in a case where processing is performed in units of domains (a set of web pages having a common domain), the processing may be performed for an evaluation target unit including a plurality of arbitrary web pages instead of the domains. The plurality of arbitrary web pages may be designated by the user. For example, the user may designate two domains as evaluation targets, and a web page having one of the two domains may be set as the evaluation target unit. Alternatively, the user may designate a specific web page, and a web page subordinate to the designated web page may be set as the evaluation target unit. In addition, the user may individually designate a plurality of web pages as the evaluation target unit.

The above-described embodiments have been described for the purpose of enabling a person having ordinary knowledge in the technical field to which the present invention belongs to implement the present invention. Various modifications of the above-described embodiments can be naturally made by those skilled in the art, and the technical idea of the present invention can be applied to other embodiments. Therefore, the present invention is not limited to the described embodiments, and should have the widest scope according to the technical idea defined by the claims.

REFERENCE SIGNS LIST

1 Search engine
2 Evaluation support device
21 Search data acquirer
22 User input acquirer
23 Classifier
24 Display data generator
25 Alert generator
26 Storage device
3 User terminal
31 Input interface
32 Controller
33 Display
41 Expected accuracy assigner
42 Counter

The invention claimed is:

1. A non-transitory computer-readable medium storing an evaluation support program that causes at least one processor to:

acquire, for each search query among a plurality of search queries, search data indicating a plurality of web pages generated from search results for the search query over a period of time;

classify each search query into a grouping among a plurality of groupings corresponding to one or more words in the plurality of search queries, wherein each of the plurality of groupings has group name different from each other, each search query has a common word difference from any group name; and generate structured data based on the search data for displaying, on a display, a screen containing evaluation information for a domain corresponding to at least two web pages among the plurality of web pages, the evaluation information structured to display, for each grouping, a list including at least a part of search queries classified into each grouping, a number of searches for each search query included in the list, and a display ranking indicating a rank in which the domain is displayed when a search is conducted by each search query included in the list.

2. The non-transitory computer-readable medium according to claim 1, wherein the evaluation information is structured to display the plurality of groupings in a ranked order.

3. The non-transitory computer-readable medium according to claim 1, wherein the evaluation information is structured to display, for each grouping, at least one of a click-through rate and a click through number for the search queries classified into the grouping.

4. The non-transitory computer-readable medium according to claim 1, wherein the evaluation support program causes the at least one processor to acquire the structured data and generate display data from the structured data for displaying the evaluation information on the display.

5. The non-transitory computer-readable medium according to claim 1, wherein the evaluation support program causes the at least one processor to set an expected accuracy of a conversion rate of the search query according to the grouping into which each of the one or more words is classified and a score set for each grouping.

6. The non-transitory computer-readable medium according to claim 5, wherein the expected accuracy is set to a plurality of levels, and each level corresponds to a first range of the conversion rate.

7. The non-transitory computer-readable medium according to claim 1, wherein the evaluation support program causes the at least one processor to set a range of a conversion rate of the search query according to the grouping into which each of the one or more words is classified and a score set for each grouping.

8. The non-transitory computer-readable medium according to claim 1, wherein the evaluation information is structured to display, for each grouping, a proportion of the search queries classified into each of the plurality of groupings according to an economic scale of each search query.

9. The non-transitory computer-readable medium according to claim 1, wherein the search queries are classified such that the search queries containing a common word are classified into a common sub-grouping; and the structured data causes a display to display a screen in which display field groups are arranged in a horizontal direction, the display field groups including a plurality of display fields associated with sub-groupings belonging to one grouping arranged in a vertical direction, and a search query classified into a sub-grouping associated with each display field is displayed in a display field.

10. The non-transitory computer-readable medium according to claim 1, wherein the evaluation support program causes the at least one processor to display the screen, the screen including in a tubular form the name of each grouping of the plurality of groupings,
the list including at least a part of search queries classified
into each grouping,
the number of searches for each search query included in
the list, and
the display ranking indicating a rank in which the domain
is displayed when a search is conducted by each search
query included in the list.

11. A non-transitory computer-readable medium storing
an evaluation support program that causes at least one
processor to:

acquire, for each search query among a plurality of search
queries, search data indicating a plurality of web pages
generated from search results for the search query over
a period of time;

classify each search query into a grouping among a
plurality of groupings corresponding to one or more
words in the plurality of search queries and a sub-
grouping among a plurality of sub-groupings corre-
sponding to one or more words in search queries
classified into the grouping, wherein each of the plu-
rality of groupings has group name different from each
other, each search query has a common word difference
from any group name; and generate structured data based on the search data for
displaying, on a display, a screen containing evaluation
information for a domain corresponding to at least two
web pages among the plurality of web pages, the
evaluation information structured to display the plural-
ity of groupings and a plurality of sub-groupings within
each grouping, the evaluation information for each
sub-grouping structured to display a list including at least a part of search queries classified
into each sub-grouping, a number of searches for each search query included in
the list, and a display ranking indicating a rank in which the domain
is displayed when a search is conducted by each
search query included in the list.

12. The non-transitory computer-readable medium
according to claim 11, wherein the list is ordered according
to a number of searches for the search queries in the list or
a click-through rate for the domain generated from the
search results for the search queries in the list.

13. The non-transitory computer-readable medium
according to claim 11, wherein the evaluation support pro-
gram causes the at least one processor to filter the list
according to a first condition.

14. The non-transitory computer-readable medium
according to claim 11, wherein the evaluation support pro-
gram causes the at least one processor to filter the list to
satisfy a first condition according to a user operation.

15. The non-transitory computer-readable medium
according to claim 11, wherein the evaluation support pro-
gram causes at least one processor to:

classify each search query into the plurality of sub-
groupings based on an economic scale of the search
query.

16. The non-transitory computer-readable medium
according to claim 11, wherein the evaluation support pro-
gram causes at least one processor to:

classify each search query into the plurality of sub-
groupings by changing a sub-grouping belonging to
one grouping to another grouping based on a user
operation.

17. The non-transitory computer-readable medium
according to claim 11, wherein the evaluation support program causes the at least one processor to display the screen,
the screen including in tabular form the name of each grouping of the plurality of groupings,
the plurality of sub-groupings within each grouping of the
plurality of groupings,
the list including the at least the part of the search queries
classified into the sub-grouping,
the number of searches for each search query included in
the list, and
the display ranking indicating the rank in which the
domain is displayed when the search is conducted by
each search query included in the list.

18. An evaluation support apparatus comprising:
a processor configured to:

acquire, for each search query among a plurality of
search queries, search data indicating a plurality of
web pages generated from search results for the
search query over a period of time;

classify each search query into a grouping among a
plurality of groupings corresponding to one or more
words in the plurality of search queries, wherein
each of the plurality of groupings has group name
different from each other, each search query has a
common word difference from any group name; and generate structured data based on the search data for
displaying, on a display, a screen containing evalu-
ation information for a domain corresponding to at
least two web pages among the plurality of web
pages, the evaluation information structured to dis-
play, for each grouping, a list including at least a part of search queries classified
into each grouping, a number of searches for each search query included in
the list, and a display ranking indicating a rank in which the domain
is displayed when a search is conducted by each
search query included in the list.

19. An evaluation support method comprising:
acquiring, for each search query among a plurality of
search queries, search data indicating a plurality of web
pages generated from search results for the search
query over a period of time;

classifying each search query into a grouping among a
plurality of groupings corresponding to one or more
words in the plurality of search queries, wherein each
of the plurality of groupings has group name different
from each other, each search query has a common word
difference from any group name; and generating structured data based on the search data for
displaying, on a display, a screen containing evaluation
information for a domain corresponding to at least two
web pages among the plurality of web pages, the
evaluation information structured to display, for each
grouping, a list including at least a part of search queries classified
into each grouping, a number of searches for each search query included in
the list, and a display ranking indicating a rank in which the domain
is displayed when a search is conducted by each
search query included in the list.

20. An evaluation support apparatus comprising:
a processor configured to:

acquire, for each search query among a plurality of
search queries, search data indicating a plurality of
web pages generated from search results for the
search query over a period of time;

classify each search query into a grouping among a plurality of groupings corresponding to one or more words in the plurality of search queries and a sub-grouping among a plurality of sub-groupings corresponding to one or more words in search queries classified into the grouping, wherein each of the plurality of groupings has group name different from each other, each search query has a common word difference from any group name; and generate structured data based on the search data for displaying, on a display, a screen containing evaluation information for a domain corresponding to at least two web pages among the plurality of web pages, the evaluation information structured to display the plurality of groupings and a plurality of sub-groupings within each grouping, the evaluation information for each sub-grouping structured to display a list including at least a part of search queries classified into each sub-grouping, a number of searches for each search query included in the list, and a display ranking indicating a rank in which the domain is displayed when a search is conducted by each search query included in the list.

21. An evaluation support method comprising:

acquiring, for each search query among a plurality of search queries, search data indicating a plurality of web pages generated from search results for the search query over a period of time;

classifying each search query into a grouping among a plurality of groupings corresponding to one or more words in the plurality of search queries and a sub-grouping among a plurality of sub-groupings corresponding to one or more words in search queries classified into the grouping, wherein each of the plurality of groupings has group name different from each other, each search query has a common word difference from any group name; and generating structured data based on the search data for displaying, on a display, a screen containing evaluation information for a domain corresponding to at least two web pages among the plurality of web pages, the evaluation information structured to display the plurality of groupings and a plurality of sub-groupings within each grouping, the evaluation information for each sub-grouping structured to display a list including at least a part of search queries classified into each sub-grouping, a number of searches for each search query included in the list, and a display ranking indicating a rank in which the domain is displayed when a search is conducted by each search query included in the list.

* * * * *